United States Patent
Agarwal et al.

(10) Patent No.: US 10,631,200 B2
(45) Date of Patent: Apr. 21, 2020

(54) SYSTEM AND METHOD FOR PACKET TRANSMISSION

(71) Applicant: QUALCOMM Incorporated, San Diego, CA (US)

(72) Inventors: Vishal Agarwal, Ramnagar (IN); Mayank Batra, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 15/636,266

(22) Filed: Jun. 28, 2017

(65) Prior Publication Data

US 2019/0007866 A1  Jan. 3, 2019

(51) Int. Cl.
| | |
|---|---|
| *H04L 1/08* | (2006.01) |
| *H04W 28/04* | (2009.01) |
| *H04W 28/06* | (2009.01) |
| *H04L 1/18* | (2006.01) |

(52) U.S. Cl.
CPC .............. *H04W 28/06* (2013.01); *H04L 1/08* (2013.01); *H04L 1/1877* (2013.01); *H04W 28/04* (2013.01)

(58) Field of Classification Search
CPC ..... H04L 1/1845; H04L 7/0016; H04L 12/56; H04L 65/606; H04L 1/08; H04L 1/1877; H04W 28/04; H04W 28/06; H04W 28/22; H04W 28/24

See application file for complete search history.

(56) References Cited

U.S. PATENT DOCUMENTS

| | | | |
|---|---|---|---|
| 8,837,586 B2 | 9/2014 | Begen et al. | |
| 9,363,788 B2 | 6/2016 | Zhang et al. | |
| 2003/0023915 A1* | 1/2003 | Choi | H04L 1/1845 714/748 |
| 2004/0098748 A1* | 5/2004 | Bo | H04N 7/17336 725/105 |

(Continued)

FOREIGN PATENT DOCUMENTS

FR  2943195 A1  9/2010

OTHER PUBLICATIONS

International Search Report and Written Opinion—PCT/US2018/034621—ISA/EPO—dated Sep. 4, 2018.

*Primary Examiner* — Michael Thier
*Assistant Examiner* — Prince A Mensah
(74) *Attorney, Agent, or Firm* — Arent Fox, LLP

(57) ABSTRACT

In a wireless communications system, packet error rate may be relatively low (e.g., five percent). Accordingly, receivers may successfully receive a first transmission the majority of the time. However, bandwidth may be used for retransmissions, which may be used relatively infrequently. Because retransmission packets do not necessarily have to be the same as transmission packets, transmission packets may be given more weight than retransmission packets. For example, transmission packets may be encoded with a higher bitrate than retransmission packets. In aspects, a transmitter may send a first transmission packet, including first data encoded with a first bitrate, and send a second transmission packet, including second data encoded with the first bitrate. The transmitter may send a first retransmission packet that includes the first data encoded with a second bitrate and the second data encoded with the second bitrate, and the first bitrate may be higher than the second bitrate.

28 Claims, 11 Drawing Sheets

(56) References Cited

U.S. PATENT DOCUMENTS

| | | |
|---|---|---|
| 2005/0089003 A1 | 4/2005 | Proctor et al. |
| 2005/0254508 A1 | 11/2005 | Aksu et al. |
| 2008/0282125 A1 | 11/2008 | Hafeez et al. |
| 2010/0017530 A1* | 1/2010 | Gaur ............... H04L 12/56 709/231 |
| 2014/0351638 A1 | 11/2014 | Chang |
| 2015/0124843 A1* | 5/2015 | Azizi ............... H04L 7/0016 370/516 |
| 2015/0180924 A1* | 6/2015 | O'Callaghan ......... H04L 65/605 709/219 |
| 2016/0191181 A1 | 6/2016 | Bailey |
| 2017/0070757 A1* | 3/2017 | Phillips ............. H04N 21/2385 |

* cited by examiner

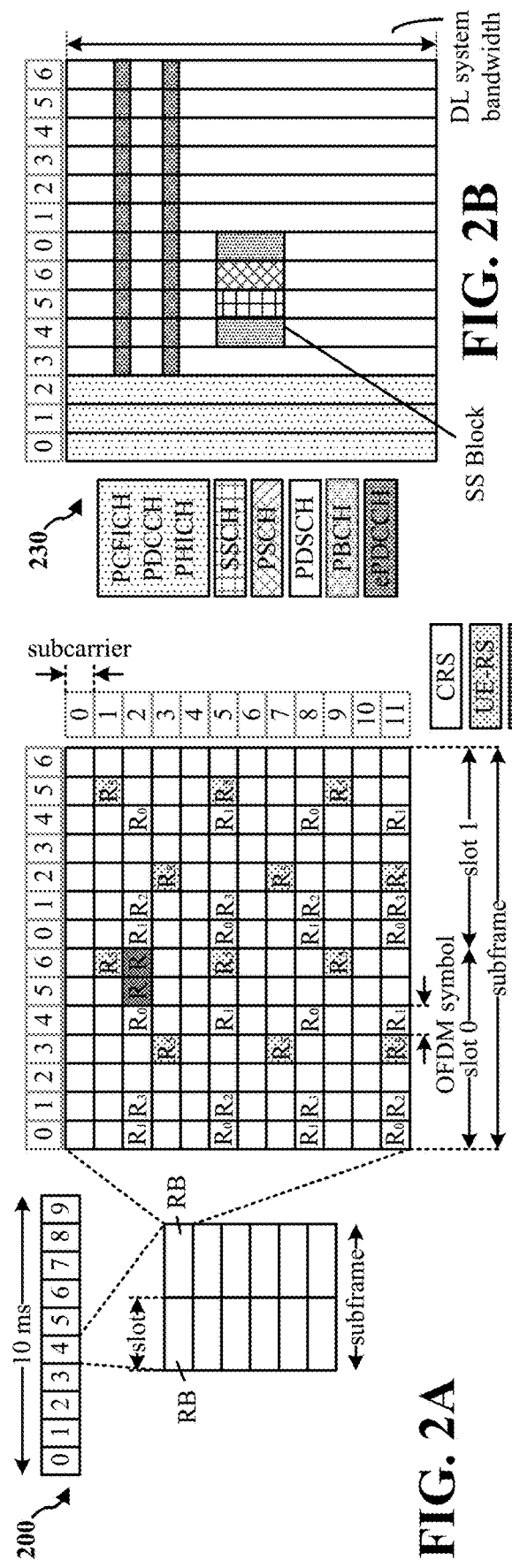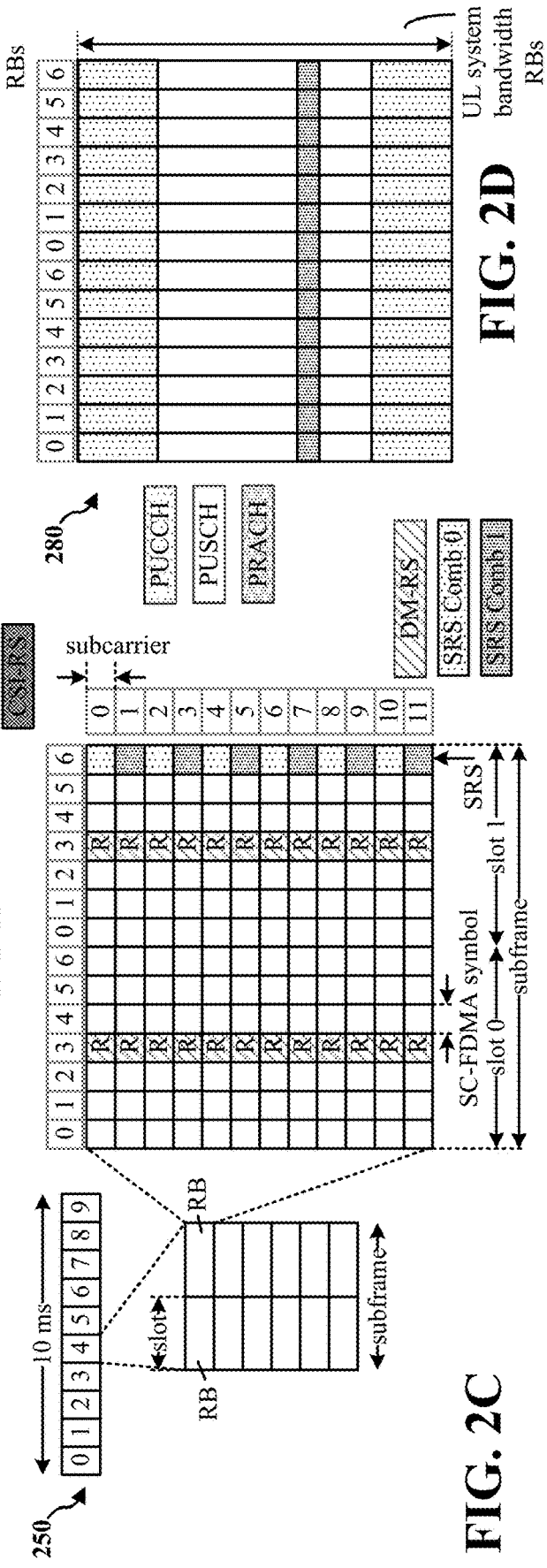

SYSTEM AND METHOD FOR PACKET TRANSMISSION

BACKGROUND

Field

The present disclosure relates generally to communication systems, and more particularly, to a transmitter configured to retransmit a data in a packet.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Transmission of high-quality audio may require a relatively large amount of bandwidth because each high-quality audio packet may be transmitted multiple times. If the required bandwidth is unavailable, then the audio quality may be compromised to adhere to the available bandwidth.

When data is transmitted over the air, the data is not always received by the receiver. Acknowledgment (ACK) feedback may be required from the receiver in order to confirm that data is successfully received. However, data may be broadcast, such as in scenarios having multiple receivers. Because the broadcast may be unidirectional, the receivers may not transmit ACK feedback indicating if the broadcast data is successfully received. To reduce the chance of a receiver missing a packet, the transmitter may transmit that same packet multiple times (e.g., three or four times). The multiple retransmissions may increase the overall bandwidth requirement of the communications system including the transmitting and receiver by a multiple of the actual rate (e.g., three or four times). For example, if a transmitter is to broadcast audio of 400 kilobits per second (kbps), then the communications system requires 12,000 kbps bandwidth to achieve two retransmissions of an audio packet and 16,000 kbps bandwidth to achieve three retransmissions of an audio packet.

In various communications system, the packet error rate may be relatively low—such as five percent for Bluetooth 2-DH5 packets. Accordingly, receivers may successfully receive a first transmission ninety-five percent of the time. However, the majority of the bandwidth of the communications system may be used for retransmissions, which will only be used relatively infrequently when a transmission is unsuccessful. Because retransmission packets do not necessarily have to be the same as transmission packets, transmission packets may be given more weight than retransmission packets. For example, transmission packets may be encoded with a higher bitrate than retransmission packets.

In an aspect of the disclosure, a first method, a first computer-readable medium, and a first apparatus are provided. The first apparatus may send a first transmission packet, the first transmission packet including first data encoded with a first bitrate. The first apparatus may send a second transmission packet, the second transmission packet including second data encoded with the first bitrate. The first apparatus may send a first retransmission packet after sending the first transmission packet and the second transmission packet, the first retransmission packet including the first data encoded with a second bitrate and the second data encoded with the second bitrate, and the first bitrate may be higher than the second bitrate. In an aspect, the first data includes at least one of audio data or video data. In an aspect, the first data includes an audio frame associated with a duration, the duration being equal when the first data is encoded with the first bitrate and when the first data is encoded with the second bitrate. In an aspect, the first transmission packet, the second transmission packet, and the first retransmission packet are sent as broadcast. In an aspect, the first retransmission packet indicates that the first data encoded with the second bitrate corresponds to the first data encoded with the first bitrate included in the first transmission packet, and the first retransmission packet further indicates that the second data encoded with the second bitrate corresponds to the second data encoded with the first bitrate included in the second transmission packet. In an aspect, the first apparatus may send a second retransmission packet after sending the first retransmission packet, the second retransmission packet including the first data encoded with a third bitrate and the second data encoded with the third bitrate. In an aspect, the third bitrate is equal to the second bitrate or the third bitrate is lower than the second bitrate. In an aspect, the first apparatus may encode, by a first digital signal processor (DSP), the first data with the first bitrate for inclusion in the first transmission packet and the second data with the first bitrate for inclusion in the second transmission packet, and encode, by a second DSP, the first data with the second bitrate for inclusion in the first retransmission packet In an aspect of the disclosure, a second method, a second computer-readable medium, and a second apparatus are provided. The second apparatus may receive a first transmission packet, the first transmission packet including first data encoded with a first bitrate. The second apparatus may receive a first retransmission packet after receiving the first transmission packet, the first retransmission packet including second data encoded with a second bitrate, wherein the first bitrate is higher than the second bitrate. The second apparatus may determine that the second data encoded with the first bitrate is unavailable to be output. The second apparatus may output the second data encoded with the second bitrate based on the determination that the second data encoded with the first bitrate is unavailable to be output. In an aspect, the first data and the second data include at least one of audio data or video data. In an aspect, the second apparatus may output the first data encoded with the first bitrate, and the output of the first data is higher quality than the output of the second data based on the first bitrate being higher than the second bitrate. In an aspect, the second apparatus may control gain associated with the output of the second data to correspond with the output of the first data. In an aspect, the second apparatus may determine that the second data encoded with the second bitrate is to be output after the output of the first data based on an indication included in the first retransmission packet indicating that the second data sequentially follows the first data. In an aspect, the first retransmission packet further includes the first data encoded with the second bitrate. In an aspect, the first transmission packet and the first retransmission packet are received as broadcast, and the reception of the first transmission packet and the reception of the first retransmission packet are unacknowledged by the receiver. In an aspect, the second apparatus may determine that the second data encoded with the first bitrate is unavailable to be output by determining that a second transmission packet is unreceived, the second transmission packet being expected to include the second data encoded with the first bitrate. In an aspect, the second apparatus may determine that the second data encoded with the first bitrate is unavailable to be output by determining that a second transmission packet including the second data encoded with the first bitrate is corrupted or the second data encoded with the first bitrate is corrupted.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
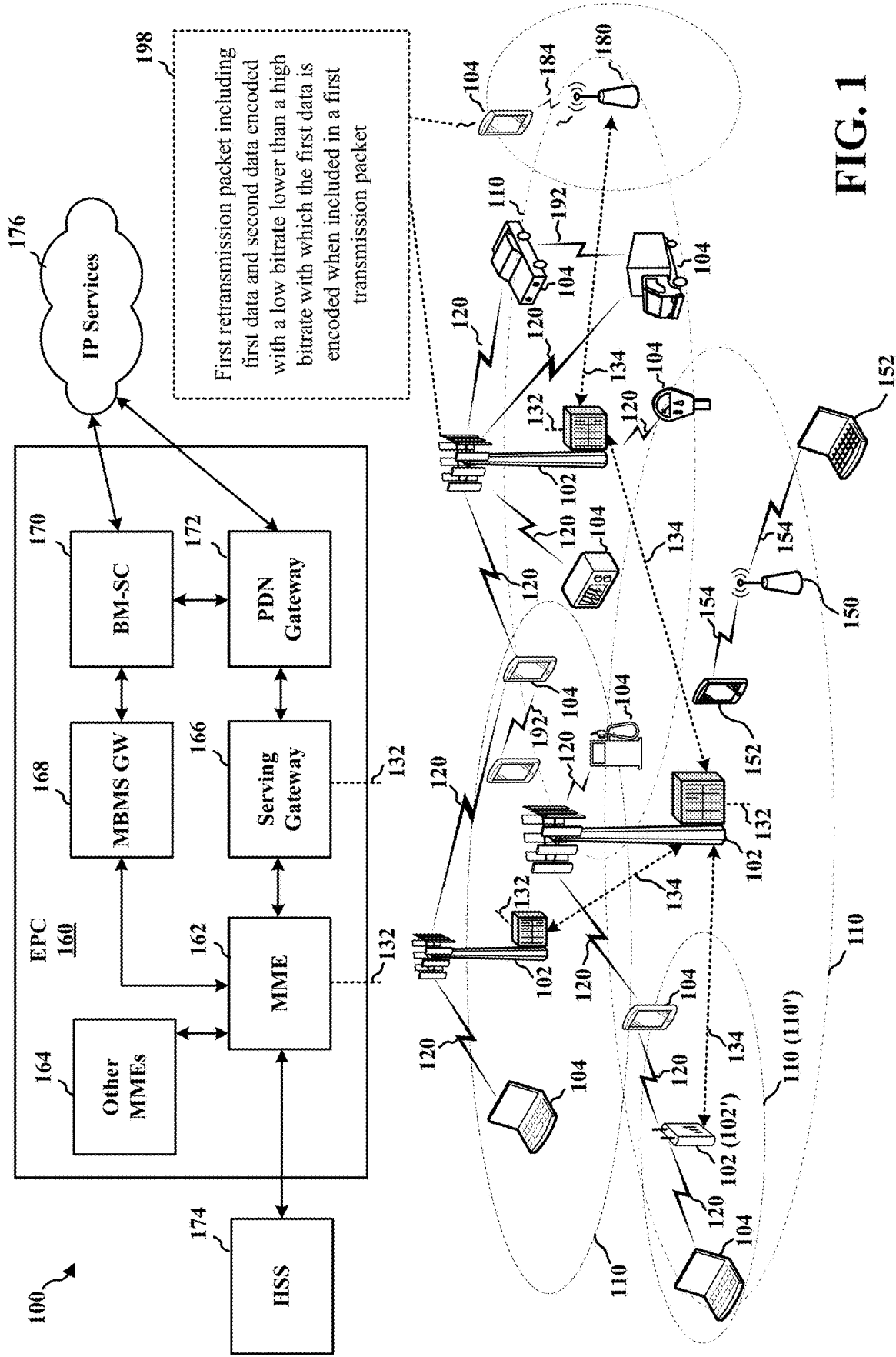
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102 may send a first transmission packet, the first transmission packet including first data encoded with a first bitrate. The base station 102 may send a second transmission packet, the second transmission packet including second data encoded with the first bitrate. The base station 102 may send a first retransmission packet 198 after sending the first transmission packet and the second transmission packet, the first retransmission packet 198 including the first data encoded with a second bitrate and the second data encoded with the second bitrate, and the first bitrate may be higher than the second bitrate. In an aspect, the first data includes at least one of audio data or video data. In an aspect, the first data includes an audio frame associated with a duration, the duration being equal when the first data is encoded with the first bitrate and when the first data is encoded with the second bitrate. In an aspect, the first transmission packet, the second transmission packet, and the first retransmission packet 198 are sent as broadcast. In an aspect, the first retransmission packet 198 indicates that the first data encoded with the second bitrate corresponds to the first data encoded with the first bitrate included in the first transmission packet, and the first retransmission packet 198 further indicates that the second data encoded with the second bitrate corresponds to the second data encoded with the first bitrate included in the second transmission packet. In an aspect, the base station 102 may send a second retransmission packet after sending the first retransmission packet, the second retransmission packet including the first data encoded with a third bitrate and the second data encoded with the third bitrate. In an aspect, the third bitrate is equal to the second bitrate or the third bitrate is lower than the second bitrate. In an aspect, the base station 102 may encode, by a first DSP, the first data with the first bitrate and the second data with the first bitrate. The base station 102 may encode, by a second DSP, the first data with the second bitrate for inclusion in the first retransmission packet 198.

The UE 104 may receive the first transmission packet, the first transmission packet including first data encoded with a first bitrate. The UE 104 may receive the first retransmission packet 198 after receiving the first transmission packet, the first retransmission packet 198 including second data encoded with a second bitrate, wherein the first bitrate is higher than the second bitrate. The UE 104 may determine that the second data encoded with the first bitrate is unavailable to be output (e.g., the UE 104 may not receive the second transmission packet or the UE 104 may be unable to decode the second data included in the second transmission packet). The UE 104 may output the second data encoded with the second bitrate based on the determination that the second data encoded with the first bitrate is unavailable to be output. In an aspect, the UE 104 may output the first data encoded with the first bitrate, and the output of the first data is higher quality than the output of the second data based on the first bitrate being higher than the second bitrate. In an aspect, the UE 104 may control gain associated with the output of the second data to correspond with the output of the first data. In an aspect, the UE 104 may determine that the second data encoded with the second bitrate is to be output after the output of the first data based on an indication included in the first retransmission packet 198 indicating that the second data sequentially follows the first data. In an aspect, the first retransmission packet 198 further includes the first data encoded with the second bitrate. In an aspect, the UE 104 does not acknowledge reception of the first transmission packet and the first retransmission packet 198—e.g., the UE 104 does not provide hybrid automatic repeat request (ARQ) (HARD) acknowledgement (ACK)/negative ACK (NACK) feedback to the base station 102 in response to packet reception. In an aspect, the UE 104 may determine that the second data encoded with the first bitrate is unavailable to be output by determining that the second transmission packet is unreceived, the second transmission packet being expected to include the second data encoded with the first bitrate. In an aspect, the UE 104 may determine that the second data encoded with the first bitrate is unavailable to be output by determining that the second transmission packet including the second data encoded with the first bitrate is corrupted or the second data encoded with the first bitrate is corrupted.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical HARQ indicator channel (PHICH) is also within symbol 0 of slot 0 and carries the HARQ indicator (HI) that indicates HARQ ACK/NACK feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
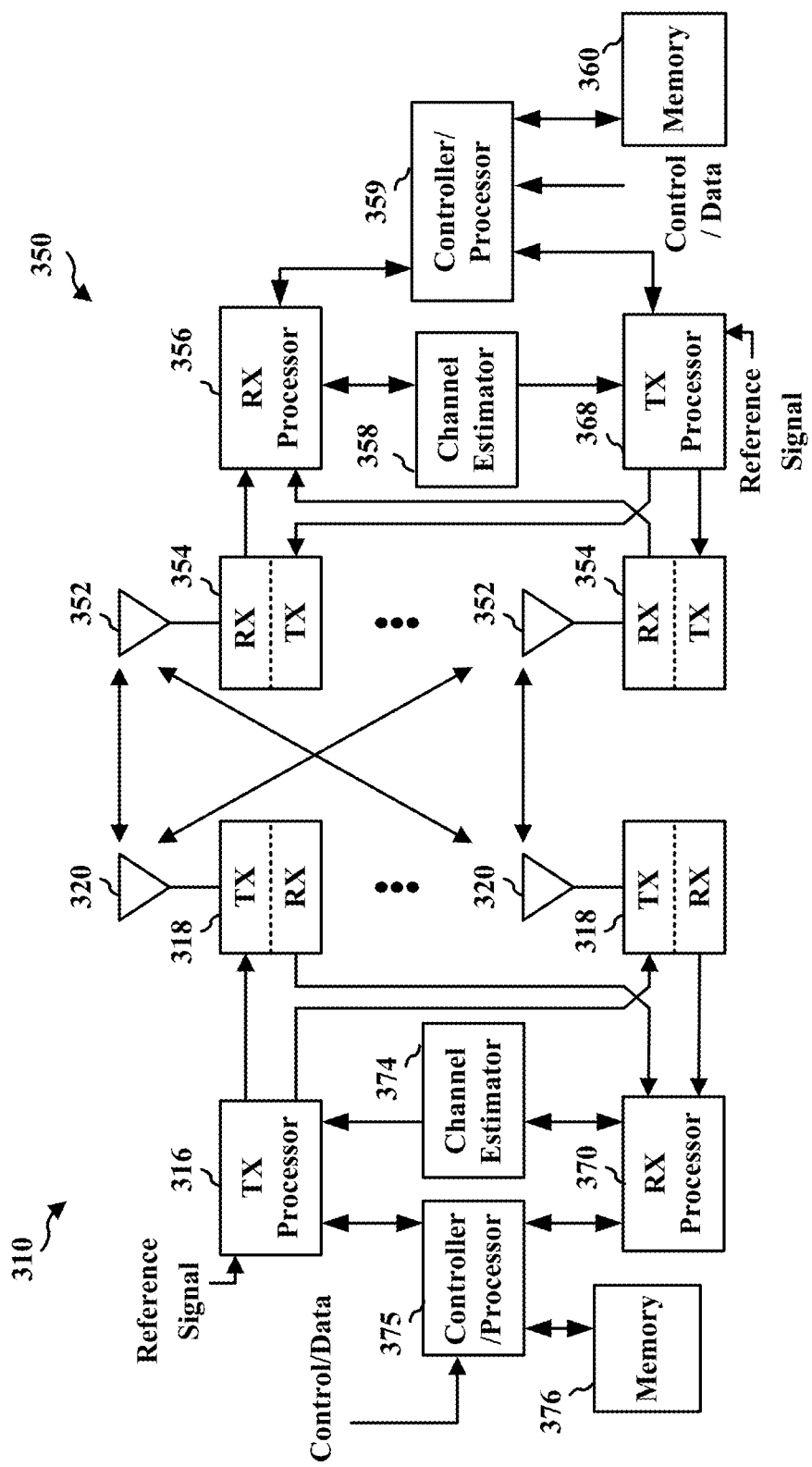
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

When data is transmitted over the air, the data is not always received by the receiver. ACK feedback may be required from the receiver in order to confirm that data is successfully received. However, data may be broadcast, such as in scenarios having multiple receivers. Because the broadcast may be unidirectional, the receivers may not transmit ACK feedback indicating if the broadcast data is successfully received. To reduce the chance of a receiver missing a packet, the transmitter may transmit that same packet multiple times (e.g., three or four times).

Figure 4:
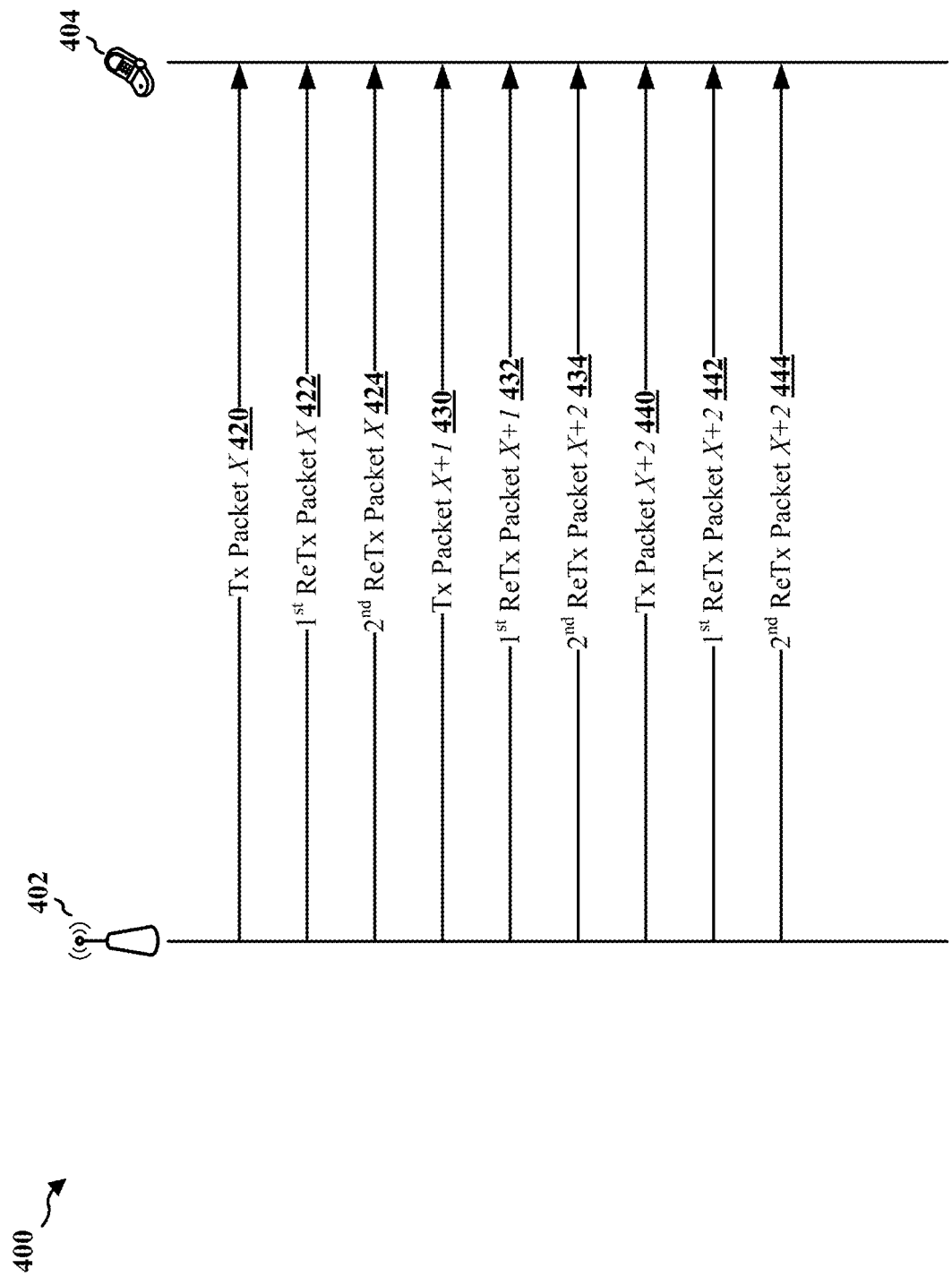
FIG. 4 is a call flow diagram of a method of wireless communication.

FIG. 4 illustrates a call flow diagram of a method 400 of wireless communication. FIG. 4 illustrates a transmitter 402 and a receiver 404. The transmitter 402 also may be configured to receive and the receiver 404 also may be configured to transmit. Various examples of transmitters 402 includes base stations (e.g., eNBs, gNBs, mmW base stations), APs, UEs, or another entity configured at least for wireless transmission of audio packets. Various examples of receivers 404 include UEs, wireless audio systems (e.g., speakers, headphones, or another entity configured to output audio signals), or another entity configured at least for wireless reception of audio packets.

In one aspect, the transmitter 402 and the receiver 404 may communicate according to one or more wireless standards, such as Bluetooth or another wireless technology standard. By way of example, the transmitter 402 and the receiver 404 may implement one or more protocols for communication of packets, such as Bluetooth Connectionless Slave Broadcast, Bluetooth Low Energy, or another protocol. In an aspect, the transmitter 402 may transmit packets on one or more isochronous channels, which may be unreliable (e.g., because packets are unacknowledged by the receiver 404).

In the method 400, a packet (e.g., audio packet) is transmitted three times: one transmission and two retransmissions. The retransmission packets may be the same as the transmission packet. Consequently, the bandwidth required by the communications system including the transmitter 402 and the receiver 404 may be three times the bandwidth required for transmission of the packet.

In various aspects, the transmitter 402 may have audio data to transmit to the receiver 404. For example, the transmitter 402 may generate audio at an application layer, which may be provided to a DSP of the transmitter 402. The DSP may encode the audio according to a specific bitrate (e.g., 400 kbps) and provide encoded audio data to a lower layer (e.g., MAC layer, PHY layer, etc.), which may packetize the encoded audio data into a plurality of packets for transmission.

In FIG. 4, the transmitter 402 transmits (e.g., broadcasts) a first transmission packet 420. The TX packet X 420 may include a first portion of the encoded audio data (e.g., an audio frame or sample). Accordingly, the receiver 404 may receive the TX packet X 420.

Because packet communication between the transmitter 402 and the receiver 404 is unacknowledged, the transmitter 402 may transmit one or more retransmission (ReTX) packets for each transmitted TX packet. For example, after transmission of the TX packet X 420, the transmitter 402 may transmit a first ReTX packet X 422 and then a second ReTX packet X 424. In aspects, the first and second ReTX packets X 422, 424 include the first portion of the encoded audio data, which is encoded at the same bitrate (e.g., 400 kbps) as the first portion of the encoded audio data included in the TX packet X 420.

The transmitter 402 performs similar operations for each packet that includes a portion of the encoded audio data. As illustrated, the transmitter 402 transmits a TX packet X+1 430, which includes a second portion of the encoded audio data. Subsequently, the transmitter 402 transmits a first TX packet X+1 432 and a second TX packet X+1 434, both of which include the second portion of the encoded audio data encoded at the same bitrate (e.g., 400 kbps) as the second portion of the encoded audio data included in the TX packet X+1 430. Additionally, the transmitter 402 transmits a TX packet X+2 440, which includes a third portion of the encoded audio data. Subsequently, the transmitter 402 transmits a first TX packet X+2 442 and a second TX packet X+2 444, both of which include the third portion of the encoded audio data encoded at the same bitrate (e.g., 400 kbps) as the third portion of the encoded audio data included in the TX packet X+2 440.

Similar operations may be performed for each packet until the transmitter 402 transmits all of the encoded audio data. While FIG. 4 illustrates two ReTX packets for each TX packet, other arrangements are comprehended by the present disclosure. For example, the transmitter 402 may transmit three ReTX packets for each TX packet. Further, the order of operations performed by the transmitter 402 may be transposed in different aspects. That is, the transmitter 402 may transmit more than one TX packet before transmitting ReTX packets—e.g., the transmitter 402 may transmit the TX packet X 420 and the TX packet X+1 430 before transmitting the first and second ReTX X packets 422, 424 and the first and second ReTX packets X+1 432, 434.

The multiple retransmissions may increase the overall bandwidth requirement of a communications system including the transmitter 402 and the receiver 404 by a multiple of the actual rate (e.g., three or four times). For example, if the transmitter 402 is to broadcast audio of 400 kbps, then the communications system requires 1200 kbps bandwidth to achieve two retransmissions of an audio packet and 1600 kbps bandwidth to achieve three retransmissions of an audio packet.

In various aspects, the receiver 404 may experience a packet error, which may refer to instances in which the receiver 404 is unable to receive a packet or the receiver 404 is unable to decode the encoded audio data included in the packet. In such instances, the receiver 404 may output the audio data received in a corresponding ReTX packet. For example, the receiver 404 may output the second portion of the audio data included in the first ReTX packet X+1 432 when the receiver 404 experiences a packet error with respect to the TX packet X+1 430.

In practice, the packet error rate may be relatively low. For example, the typical packet error rate for Bluetooth 2-DH5 packets may be approximately five percent. Effectively, the receiver 404 may correctly receive the TX packets approximately ninety-five percent of the time. Consequently, the majority of the bandwidth is consumed by retransmissions of packets, when the retransmitted packets are infrequently used by the receiver 404. Therefore, wireless communications systems may benefit from an alternative use of the bandwidth. For example, reducing the bitrate of encoded audio data included in the ReTX packets may reduce bandwidth usage to improve latency. In another example, reducing the bitrate of encoded audio data included in the ReTX packets may allow audio data included in the TX packets to be encoded at a higher bitrate without exceeding bandwidth limitations.

Figure 5:
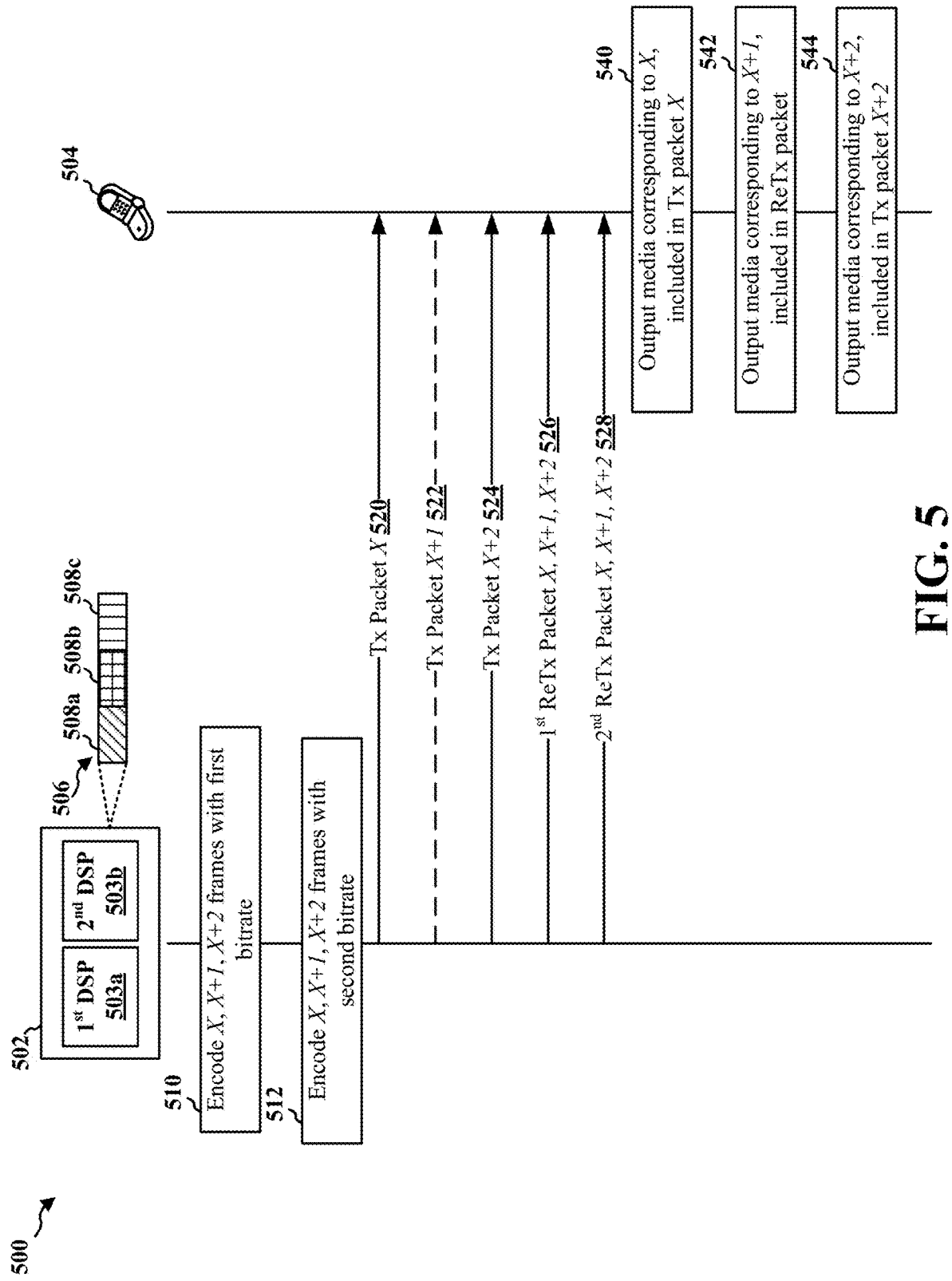
FIG. 5 is a call flow diagram of a method of wireless communication.

FIG. 5 illustrates a call flow diagram of a method 500 of wireless communication. FIG. 5 illustrates a transmitter 502 and a receiver 504. The transmitter 502 also may be configured to receive and the receiver 504 also may be configured to transmit. Various examples of a transmitter 502 include base station (e.g., eNB, gNB, mmW base station, etc.), an AP, a UE, or another entity configured at least for wireless transmission of audio packets. Various examples of a receiver 504 includes a UE, a wireless audio system (e.g., speakers, headphones, or another entity configured to output audio signals), a wireless multimedia system (e.g., a home theater, a television, a display, etc.), a personal media device, or another entity configured at least for wireless reception of audio packets.

In one aspect, the transmitter 502 and the receiver 504 may communicate according to one or more wireless standards, such as Bluetooth or another wireless technology standard. By way of example, the transmitter 502 and the receiver 504 may implement one or more protocols for communication of packets, such as Bluetooth Connectionless Slave Broadcast, Bluetooth Low Energy, or another protocol. In an aspect, the transmitter 502 may transmit packets on one or more isochronous channels, which may be unreliable (e.g., because packets are unacknowledged by the receiver 504).

In the method 500, an audio or video frame or sample (hereinafter, frame) may be transmitted three times: one TX packet includes a frame encoded with a first bitrate and each retransmission includes the frame encoded with a second bitrate that is different (e.g., lower) than the first bitrate. Consequently, the bandwidth required by ReTX packets in the communications system, including the transmitter 502 and the receiver 504, may be reduced because ReTX packets include frames encoded with a lower bitrate relative to that with which frames included in TX packets are encoded.

In another aspect, reducing the bitrate with which retransmitted frames are encoded may allow for different encoding configurations. For example, bandwidth may be differently used when retransmitted frames are encoded with a lower bitrate. In one aspect, frames included in TX packets (e.g., originally transmitted frames) may be encoded with a higher bitrate than would be otherwise possible because bandwidth usage may be reduced by encoding frames for retransmission with a lower bandwidth. In comparison to the method 400 of FIG. 4, frames X, X−1, X+2 508*a-c* included in TX packets X, X+1, X+2 520, 522, 524 may be encoded with a higher bitrate than an available bitrate with which frames included in TX packets X, X−1, X+2 420, 430, 440 could be encoded (e.g., because ReTX packets 422, 424, 432, 434, 442, 444 are encoded with that same available bitrate). By way of example, if in FIG. 4 the highest available bitrate is 250 kbps (requiring 750 total kbps for two retransmissions), then in FIG. 5 encoding for TX packets X, X+1, X+2 520, 522, 524 may be done at 450 kbps and encoding for ReTX packets X, X|1, X|2 526, 528 can be done at 150 kbps for a total of 750 kbps.

While the method 500 illustrates three transmissions of a frame (e.g., one transmission followed by two retransmissions), the present disclosure comprehends aspects in which a frame is transmitted more or fewer times. By way of example, the transmitter 502 may transmit a frame four times: one transmission and three retransmissions.

In various aspects, the transmitter 502 may have an audio or video media 506 (e.g., a file or other stored data, a digital data stream, data received through a microphone or camera, etc.) to transmit to the receiver 504. For example, the transmitter 502 may generate the media 506 at an application layer. The media 506 may be provided to a first DSP 503*a* and a second DSP 503*b* of the transmitter 502.

The transmitter 502 may segment the media 506 into a plurality of frames 508*a-c*: a frame X 508*a*, frame X−1 508*b*, and frame X+2 508*c*. Each of frames X 508*a*, X+1508*b*, X+2 508*c* may therefore include data (e.g., audio or video data) forming the media 506. While three frames are illustrated, the present disclosure comprehends aspects in which a media 506 is constituted of more or fewer frames (e.g., a media 506 may be tens, hundreds, or thousands of frames).

In various aspects, the first and second DSPs 503*a-b* of the transmitter 502 may be configured with a respective codec. In one aspect, the first and second DSPs 503*a-b* may be a same DSP configured with different codec settings. In another aspect, the first DSP 503*a* may be different from the second DSP 503*b*. The first DSP 503*a* may be configured to encode with a first bitrate, whereas the second DSP 503*b* may be configured to encode with a second bitrate.

The first DSP 503*a* may encode 510 frames X 508*a*, X+1 508*b*, X+2 508*c* with a first bitrate, such as 400 kbps, 328 kbps, or another bitrate. The second DSP 503*b* may encode 512 frames X 508*a*, X+1 508*b*, X+2 508*c* with at least a second bitrate that is lower than the first bitrate, such as 200 kbps, 128 kbps, or another bitrate. While the second DSP 503*b* may encode 512 frames X 508*a*, X+1 508*b*, X+2 508*c* with a second bitrate, the second DSP 503*b* may encode 512 frames X 508*a*, X+1 508*b*, X−2 508*c* so that frames X 508*a*, X+1 508*b*, X+2 508*c* encoded with the second bitrate have a same (or substantially similar) duration as frames X 508*a*, X+1 508*b*, X+2 508*c* encoded with the first bitrate.

At the transmitter 502, frames X 508*a*, X−1 508*b*, X+2 508*c* encoded with the first bitrate may be provided to a lower layer (e.g., MAC layer, PHY layer, etc.), which may packetize frames X 508*a*, X+1 508*b*, X+2 508*c* encoded with the first bitrate into a plurality of packets for transmission: frame X 508*a* may be packetized into TX packet X 520, frame X 1 508*b* may be packetized into TX packet X|1 522, frame X+2 508*c* may be packetized into TX packet X+2 524.

The transmitter 502 may include an indication associated with a frame 508, such as a first indication associated with frame X 508*a*, a second indication associated with frame X+1 508*b*, and a third indication associated with frame X+2 508*c*. For example, the indication may be included in a header. An example of an indication includes a sequence number or other sequential value. An indication may facilitate in-order delivery of frames so that the media 506 may be sequentially output by the receiver 504. In another aspect, an indication may be associated with scheduling of the packets 520, 522, 524, 526, 528. For example, the transmitter 502 may indicate, to the receiver 504, information indicating when TX packets 520, 522, 524 are scheduled (e.g., subframes, slots, or another resource) and information indicating when ReTX packets 526, 528 are scheduled (e.g., subframes, slots, or another resource).

The transmitter 502 may transmit TX packet X 520, TX packet X+1 522, and TX packet X+2 524. In one aspect, the transmitter 502 may broadcast TX packet X 420, TX packet X+1 522, and TX packet X+2 524.

In order to facilitate reception and output of the media 506 by the receiver 504, the transmitter 502 may retransmit frames X 508*a*, X+1 508*b*, X+2 508*c*. However, the transmitter 502 may retransmit frames X 508*a*, X+1 508*b*, X−2 508*c* with a lower bitrate. By encoding frames X 508*a*, X+1 508*b*, X+2 508*c* with a lower bitrate for retransmission than the first bitrate for transmission, bandwidth and/or protocol conditions may be satisfied. For example, retransmission of frames X 508*a*, X+1 508*b*, X+2 508*c* encoded with a lower bitrate than the first bitrate may prevent communication of frames X 508*a*, X+1 508*b*, X+2 508*c* from exceeding bandwidth limitations. Moreover, retransmission of frames X 508*a*, X+1 508*b*, X+2 508*c* encoded with a lower bitrate than the first bitrate may reduce signaling overhead and/or latency.

When retransmitting frames X 508*a*, X+1 508*b*, X+2 508*c*, the transmitter 502 may combine a plurality of frames into a single packet. For example, the transmitter 502 may aggregate frames X 508*a*, X−1 508*b*, X+2 508*c* encoded with the second bitrate into a first ReTX packet X, X+1, X+2 526.

In one aspect, the transmitter 502 may include, in a ReTX packet 526, 528, an indication of which frame in the ReTX packet 526, 528 corresponds to which frame in a TX packet 520, 522, 524. For example, the transmitter 502 may include, in the first ReTX packet X, X|1, X|2 526 an indication that frame X 508*a* encoded with the second bitrate corresponds to frame X 508*a* encoded with the first bitrate included in the TX packet X 520. Similarly, the transmitter 502 may include, in the first ReTX packet X, X|1, X|2 526 an indication that frame X|1 508*b* encoded with the second bitrate corresponds to frame X+1 508*b* encoded with the first bitrate included in the TX packet X−1 522. Similarly, the transmitter 502 may include, in the first ReTX packet X, X+1, X+2 526 an indication that frame X−2 508*c* encoded with the second bitrate corresponds to frame X+2 508*c* encoded with the first bitrate included in the TX packet X+2 524. In an aspect, the transmitter 502 may include an indication as a sequence number or other sequential value, for example, in a header. For example, the transmitter 502 may include a first sequence number associated with frame X 508*a* in the TX packet X 520 and, correspondingly, the transmitter 502 may include that first sequence number in association with frame X 508*a* in the first ReTX packet X, X+1, X+2 526.

The transmitter 502 may then transmit (e.g., broadcast) the first ReTX packet X, X+1, X+2 526. In various aspects, the transmitter 502 may repeatedly retransmit frames X, X+1, X+2 508*a-c*. Therefore, the transmitter 502 may additionally transmit (e.g., broadcast) a second ReTX packet X, X+1, X+2 528, in which frames X, X+1, X+2 508*a-c* are aggregated. According to an aspect, the second ReTX packet X, X+1, X+2 528 includes frames X, X+1, X+2 508*a-c* encoded with the second bitrate.

In another aspect, the transmitter 502 may encode frames X, X+1, X+2 508*a-c* with a third bitrate (e.g., using a third DSP or another setting of the first DSP 503*a*), and the third bitrate may be different from the first bitrate and the second bitrate. For example, the third bitrate may be lower than both the first bitrate and the second bitrate, such as 100 kbps or 96 kbps. The probability that the receiver 504 will fail to receive or decode both the original TX packet (e.g., the TX packet X+1 522) and the first ReTX packet X, X+1, X+2 524 may be relatively low (e.g., less than five percent). Thus, the receiver 504 likely can avoid using a subsequent retransmission of a frame (e.g., frame X+1 508*b* included in the second ReTX packet X, X+1, X+2 528) and, therefore, bandwidth and signaling overhead may be conserved by reducing the bitrate used for subsequent retransmissions of frames that will likely be unused.

While the transmitter 502 may encode frames X 508*a*, X+1 508*b*, X+2 508*c* with the third bitrate, the transmitter 502 may encode frames X 508*a*, X+1 508*b*, X+2 508*c* so that frames X 508*a*, X|1 508*b*, X|2 508*c* encoded with the third bitrate have a same (or substantially similar) duration as frames X 508*a*, X+1 508*b*, X+2 508*c* encoded with the first bitrate (as well as frames X 508*a*, X+1 508*b*, X+2 508*c* encoded with the second bitrate).

Similar to the first ReTX packet X, X+1, X+2 526, the second ReTX packet X, X+1, X+2 528 may include respective indications (e.g., sequence numbers or values) indicating correspondence between a respective one of frames X, X+1, X+2 508*a-c* included in the second ReTX packet X, X+1, X+2 528 to a respective one of frames X, X+1, X+2 508*a-c* included in a respective one of TX packets X, X+1, X+2 520, 522, 524. For example, frame X 508*a* may be associated with a first value in all of the TX packet X 520, the first ReTX packet X, X+1, X+2 526, and the second ReTX packet X, X+1, X+2 528. Similarly, frame X+1 508*b* may be associated with a second value in all of the TX packet X+1 522, the first ReTX packet X, X+1, X+2 526, and the second ReTX packet X, X−1, X+2 528. Similarly, frame X+2 508*c* may be associated with a third value in all of the TX packet X+2 524, the first ReTX packet X, X+1, X+2 526, and the second ReTX packet X, X−1, X+2 528.

While the transmitter 502 is illustrated as aggregating frames X 508*a*, X+1 508*b*, X+2 508*c* encoded with the second bitrate into a first ReTX packet X, X−1, X+2 526, the present disclosure comprehends aspects in which any number of frames are aggregated into a packet. For example, the first ReTX packet X, X+1, X+2 526 could include frames X 508*a* and X+1 508*b*, or the first ReTX packet X, X+1, X+2 526 could include frames 508*a*, X+1 508*b*, X+2 508*c* as well as additional frames. Similarly, the second ReTX packet X, X+1, X+2 528 may include any number of frames, and the number of frames may not be equal between the first ReTX packet X, X+1, X+2 526 and the second ReTX packet X, X+1, X+2 528.

The receiver 504 may listen or detect for packets from the transmitter 502. For example, the receiver 504 may receive the TX packet X 520 and the TX packet X|2 524. In one aspect, the receiver 504 may not acknowledge TX packets to the transmitter 502 (e.g., as is the case with broadcast).

When the receiver 504 receives the TX packet X 520 and the TX packet X|2 524, the receiver may decode the TX packet X 520 and the TX packet X+2 524 according to the first bitrate and deliver the decoded frames X 508*a* and X+2 508*c* to the higher layers (e.g., application layer) of the receiver 504. The receiver 504 may then be able to output the data of the media 506 corresponding to frame X 508*a* and frame X+2 508*c* with the first bitrate.

However, the receiver 504 may be unable to deliver frame X|1 to the higher layers (e.g., application layer). In various aspects, the receiver 504 may determine that frame X+1 508*b* encoded with the first bitrate is unavailable to be output. For example, the receiver 504 may identify or detect a first indication (e.g., a first sequence number) associated with frame X 508*a* included in the TX packet X 520, and the receiver 504 may identify or detect a third indication (e.g., a third sequence number) associated with frame X−2 508*c* included in the TX packet X+2 524. The receiver 504 may determine that frame X+1 508*b* is absent by determining that a frame associated with a second indication (e.g., a second sequence number) sequentially occurring between the first and third indications is absent.

In one aspect, the receiver 504 may determine that the TX packet X+1 522, expected to include frame X−1 508*b*, is unreceived by the receiver 504 (e.g., interference or poor channel conditions may prevent the receiver 504 from receiving the TX packet X+1 522). In another example, the receiver 504 may determine that the TX packet X+1 522 is corrupted and/or frame X+1 508*b* included in the TX packet X+1 522 is corrupted. When the TX packet X+1 522 and/or frame X+1 508*b* included in the TX packet X+1 522 is corrupted, the receiver 504 may be unable to decode the audio and/or video of frame X+1 508*b* to deliver to a higher layer (e.g., application layer).

The receiver 504 may receive at least one of the first ReTX packet X, X+1, X−2 526 and/or the second ReTX packet X, X+1, X+2 528. In an aspect, the receiver 504 may not acknowledge the first ReTX packet X, X+1, X+2 526 and/or the second ReTX packet X, X+1, X+2 528 to the transmitter 502 (e.g., in the case of broadcast). If the receiver 504 receives the first ReTX packet X, X+1, X+2 526, the receiver 504 may discard the second ReTX packet X, X+1, X+2 528. (If the receiver 504 is able to receive the TX packet X|1 522 and decode frame X|1 508*b*, the receiver 504 may discard the first ReTX packet X, X+1, X+2 526 as well.)

In aspects, the receiver 504 may decode at least frame X+1 508*b* included in the first ReTX packet X, X|1, X|2 526 or the second ReTX packet X, X|1, X|2 528 (e.g., if the first ReTX packet X, X+1, X+2 526 is unreceived and/or corrupted). The receiver 504 may decode frame X+1 508*b* according to the lower bitrate relative to the first bitrate—e.g., the second bitrate or the third bitrate if the transmitter 502 encoded frame X+1 508*b* with the third bitrate in the second ReTX packet X, X+1, X+2 528 and the receiver 504 uses the second ReTX packet X, X−1, X+2 528). The receiver 504 may provide the frame X|1 508*b*, decoded according to the lower bitrate relative to the first bitrate, to a higher layer (e.g., application layer) to be output.

The receiver 504 may output 542 media (e.g., audio or video) corresponding to frame X+1 508*b*, for example, after outputting 540 media of frame X 508*a* and before outputting 544 media of frame X+2 508*c*. Because frame X+1 508*b* was encoded with the lower bitrate relative to the first bitrate, the quality of the output 542 of data of frame X+1 508*b* may be lower than the quality of the output 540 of data of frame X 508*a* and the quality of output 544 of data of frame X+2 508*c*. However, because packet error rate may be relatively low (e.g., approximately five percent for Bluetooth 2-DH5 packets), the receiver 504 may output the majority of the media 506 according to the first bitrate.

In one aspect, the receiver 504 may switch between different codecs in order to output data encoded with different bitrates. For example, the receiver 504 may output 540 media of the frame X 508*a* using a first codec and output 542 media of the frame X+1 508*b* using a second codec, which may be configured in a same or different DSP as the first codec. In various aspects, the receiver 504 may perform one or more operations in order to cause smooth and seamless output 542 of media of frame X+1 508*b* relative to output 540, 544 of media of frames X, X+2 508*a, c*. For example, the receiver 504 may control gain associated with output 542 of media of frame X+1 508*b* to be similar to the output 540, 544 of media of frames X, X+2 508*a*, 508*c* (e.g., in order to maintain a relatively consistent volume level when switching between codecs).

In various aspects, latency associated with output 540, 542, 544 by the receiver 504 may be affected in association with the aggregation, in the first and second ReTX packets X, X+1, X+2 526, 528, of frames X, X+1, X−2 508*a-c* encoded with a lower bitrate relative to the first bitrate. The effect on latency may depend upon decoding operations of the receiver 504. In one aspect, latency of output may be decreased (e.g., relative to the method 400 of FIG. 4) if the receiver 504 includes a decoder (e.g., DSP) configured to begin output (e.g., playing audio) when the receiver 504 receives a plurality of packets. For example, the receiver 504 may be configured to buffer media before output, and so when the receiver 504 receives a fixed number of packets N, latency may be reduced because retransmitted frames are aggregated in a single ReTX packet rather than individually retransmitted in separate ReTX packets. The effect on latency may be different, for example, if the receiver 504 is configured to output data of frames when packets including those frames are received (e.g., no buffering).

Figure 6:
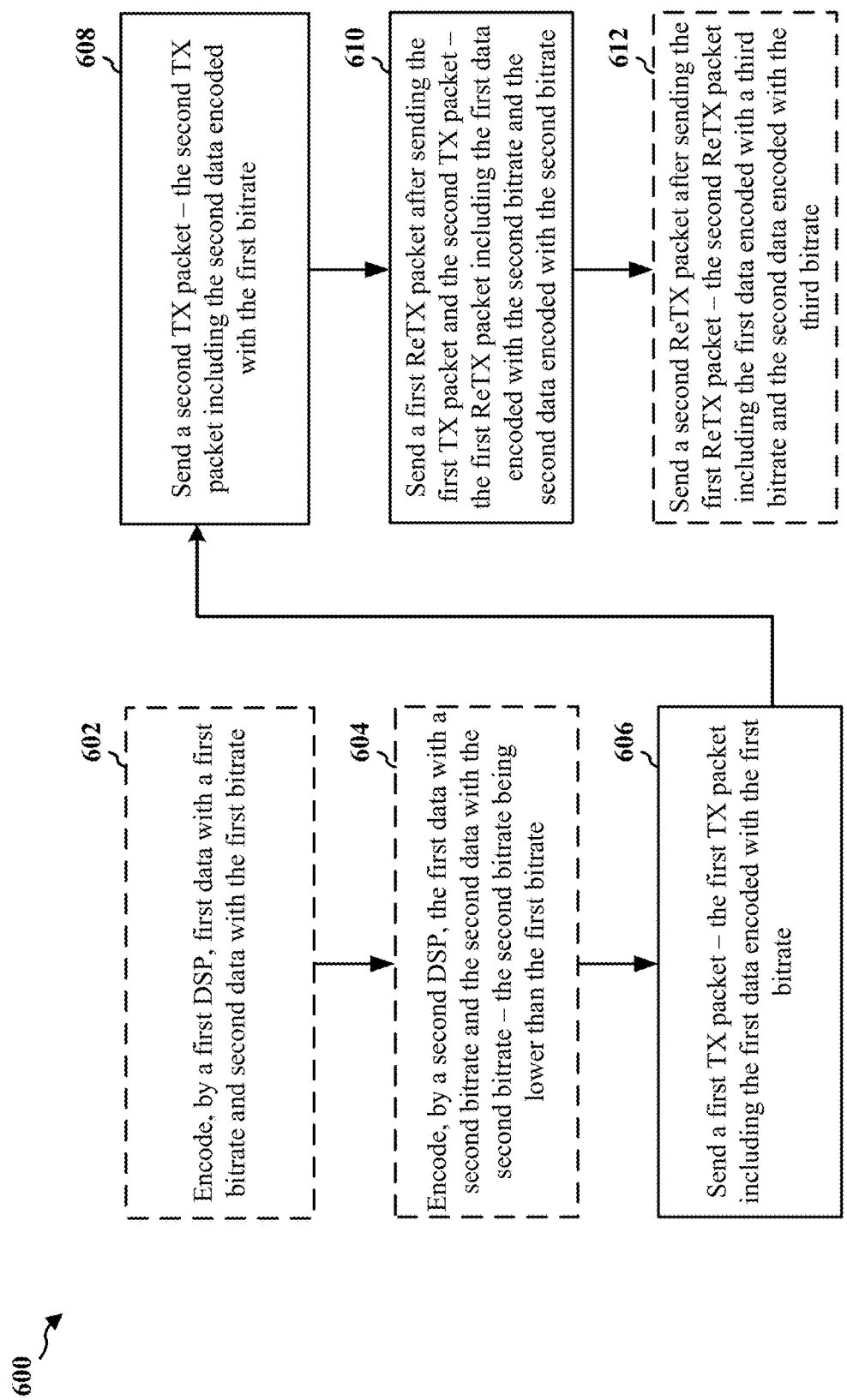
FIG. 6 is a flowchart of a method of wireless communication.

FIG. 6 is a flowchart of a method 600 of wireless communication. The method 600 may be performed by a transmitter (e.g., the transmitter 502, the apparatus 802/802'). In different aspects, one or more operations may be added, omitted, or contemporaneously performed.

Beginning with operation 602, the transmitter may encode, by a first DSP, first data with a first bitrate and second data with the first bitrate. In one aspect, the first data and the second data may compose audio and/or video data (e.g., media such as an audio or video stream or segment)— e.g., the first data and the second data may be audio or video samples or frames.

According to an aspect, the transmitter may select a bitrate for transmission of media composed of the first data and the second data. The transmitter may provide the first data and the second data to a first DSP configured to encode data with the first bitrate. In another aspect, the transmitter may select a first setting on the first DSP, and the first setting may cause the first DSP to encode data with the first bitrate. The first DSP of the transmitter may then encode the first data and the second data with the first bitrate. In the context of FIG. 5, the first DSP 503a of the transmitter 502 may encode 510 the frames X, X+1, X+2 508a-c with a first bitrate.

At operation 604, the transmitter may encode, by a second DSP, the first data with a second bitrate and the second data with the second bitrate. In aspects, the second bitrate may be lower than the first bitrate, which may cause a reduction in the quality of output of media composed of the first and second data. However, the first data and second data may represent a discrete interval of the media, whether encoded with the first bitrate or the second bitrate. For example, the first data may be an audio frame of a particular duration, and the duration may be the same (or substantially similar) when the first data is encoded with the first bitrate and when the first data is encoded with the second bitrate.

According to an aspect, the transmitter may select a bitrate for retransmission of media composed of the first data and the second data. The transmitter may provide the first data and the second data to a second DSP configured to encode data with the second bitrate. In another aspect the first DSP may be the second DSP: the transmitter may select a second setting on the first DSP, and the second setting may cause the first DSP to encode data with the second bitrate. The second DSP of the transmitter may then encode the first data and the second data with the second bitrate. In the context of FIG. 5, the second DSP 503b of the transmitter 502 may encode 512 the frames X, X+1, X−2 508a-c with a second bitrate, the second bitrate being lower than the first bitrate.

At operation 606, the transmitter may send a first TX packet. The first TX packet may include the first data encoded with the first bitrate. For example, the transmitter may generate a first packet to include the first data, and the transmitter may transmit the first packet. In an aspect, the transmitter may send the first TX packet as a broadcast, which may be unacknowledged by one or more receivers. In the context of FIG. 5, the transmitter 502 may transmit the TX packet X 520, which may include the frame X 508a encoded with the first bitrate.

At operation 608, the transmitter may send a second TX packet. The second TX packet may include the second data encoded with the first bitrate. For example, the transmitter may generate a second packet to include the second data, and the transmitter may transmit the second packet. In an aspect, the transmitter may send the second TX packet as a broadcast, which may be unacknowledged by one or more receivers. In the context of FIG. 5, the transmitter 502 may transmit the TX packet X+1 522, which may include the frame X+1 508b encoded with the first bitrate.

At operation 610, the transmitter may send a first ReTX packet after sending the first TX packet and the second TX packet. The first ReTX packet may include the first data encoded with the second bitrate and the second data encoded with the second bitrate. For example, the transmitter may generate a packet and the transmitter may include, in the packet, the first data and the second data encoded with the second bitrate. The transmitter may then transmit (e.g., broadcast) the generated packet including the first and second data encoded with the second bitrate. In the context of FIG. 5, the transmitter 502 may transmit the first ReTX packet X, X+1, X+2 526.

In an aspect, the first ReTX packet, may indicate that the first data encoded with the second bitrate corresponds to the first data encoded with the first bitrate included in the first TX packet. Further, the first ReTX packet may indicate that the second data encoded with the second bitrate corresponds to the second data encoded with the first bitrate included in the second TX packet. For example, the transmitter may include respective values (e.g., sequence numbers) indicating correspondence between first and second data included in the first ReTX packet to first and second data included in the first and second TX packets. In another aspect, the transmitter may indicate correspondence based on one or more resources (e.g., subframes or slots) in which the first and second TX packets are transmitted and one or more resources (e.g., subframes or slots) in which the first ReTX packet is transmitted. For example, scheduling of TX packets and ReTX packets may indicate position in time of data (e.g., frames or samples) in a media (e.g., audio/video stream) or in a broadcast.

At operation 612, the transmitter may send a second ReTX packet after sending the first ReTX packet. The second ReTX packet may include the first data encoded with a third bitrate and the second data encoded with the third bitrate. In an aspect, the third bitrate may be the same as the second bitrate. In another aspect, the third bitrate may be lower than the second bitrate. For example, the transmitter may generate a packet and the transmitter may include, in the packet, the first data and the second data encoded with the third bitrate. The transmitter may then transmit (e.g., broadcast) the generated packet including the first and second data encoded with the third bitrate. In the context of FIG. 5, the transmitter 502 may transmit the second ReTX packet X, X+1, X+2 528.

Figure 7:
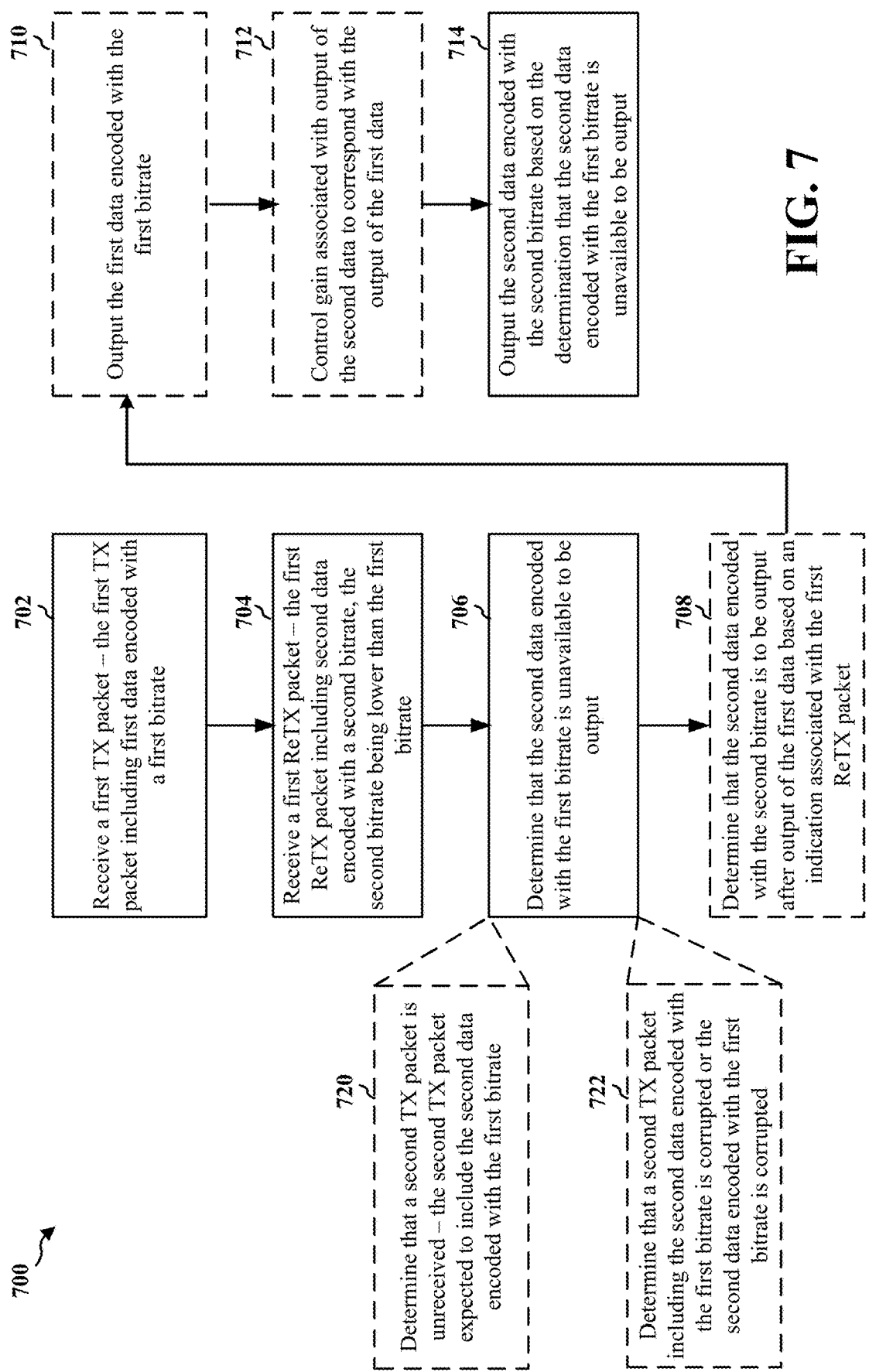
FIG. 7 is a flowchart of a method of wireless communication.

FIG. 7 is a flowchart of a method 700 of wireless communication. The method 700 may be performed by a receiver (e.g., the receiver 504, the apparatus 1002/1002'). In different aspects, one or more operations may be added, omitted, or contemporaneously performed.

At operation 702, the receiver may receive a first TX packet. The first TX packet may include first data encoded with a first bitrate. For example, the receiver may listen or monitor for packets, for example, on a broadcast channel during a scheduled broadcast. The receiver may detect the first TX packet and the receiver may extract the first data from the first TX packet. However, the receiver may not acknowledge the first TX packet. In the context of FIG. 5, the receiver 504 may receive the TX packet X 520, which may include the frame X 508*a* encoded with the first bitrate.

At operation 704, the receiver may receive a first ReTX packet. The first ReTX packet may include second data encoded with a second bitrate, and the second bitrate may be lower than the first bitrate with which the first data is encoded. For example, the receiver may listen or monitor for packets, for example, on a broadcast channel during a scheduled broadcast. The receiver may detect the first ReTX packet and the receiver may extract the second data from the first ReTX packet. However, the receiver may not acknowledge the first ReTX packet. In an aspect, the first ReTX packet may further include at least the first data encoded with the second bitrate. In the context of FIG. 5, the receiver 504 may receive the first ReTX packet X, X+1, X+2 526, which may include the frame X+1 508*b* encoded with the second bitrate (and the frame X 508*a* encoded with the second bitrate).

At operation 706, the receiver may determine that the second data encoded with the first bitrate is unavailable to be output. For example, the receiver may identify a position (e.g., position in time or sequence) of the first data (e.g., frame or sample) in a media (e.g., audio/video stream) and the receiver may determine that second data (e.g., frame or sample encoded with the first bitrate) of a position that follows the position of the first data is absent or unreceived. Accordingly, the receiver may determine that data from a ReTX packet is to be used to fill the position following the position of the first data in the media. In the context of FIG. 5, the receiver 504 may determine that the frame X+1 508*b* encoded with the first bitrate is unavailable to be output.

In an aspect, operation 706 may include operation 720. At operation 720, the receiver may determine that a second TX packet is unreceived. The second TX packet may be expected to include the second data encoded with the first bitrate. For example, the receiver may identify or detect (e.g., at a MAC layer of the receiver) a first sequence number of the first TX packet including the first data. The receiver may further identify or detect (e.g., at the MAC layer of the receiver) a third sequence number of a third TX packet received by the receiver. The receiver may determine that a second TX packet associated with a second sequence number (e.g., between the first and third sequence numbers) is unreceived. Accordingly, the receiver may determine that second data encoded with the first bitrate, expected to be included in the unreceived second TX packet, is unreceived and unavailable to be output. In the context of FIG. 5, the receiver 504 may determine that the TX packet X+1 522, including the frame X+1 508*b* encoded with the first bitrate, is unreceived.

In an aspect, operation 706 may include operation 722. At operation 722, the receiver may determine that a second TX packet is corrupted or that second data encoded with the first bitrate is corrupted. The second TX packet may be expected to include the second data encoded with the first bitrate. For example, the receiver may determine a sequence number associated with the second TX packet or the second data encoded with the first bitrate. The receiver may determine that the second TX packet is corrupted or that the second data encoded with the first bitrate is corrupted (e.g., based on cyclic redundancy check (CRC), block error rate (BLER), or another error detection mechanism). Accordingly, the receiver may determine that second data encoded with the first bitrate, expected to be included in the second TX packet, is corrupted and unavailable to be output. In the context of FIG. 5, the receiver 504 may determine that the frame X+1 508*b* encoded with the first bitrate is corrupted or that the TX packet X−1 522 is corrupted.

At operation 708, the receiver may determine, based on an indication associated with the first ReTX packet, that the second data encoded with the second bitrate is to be output after output of the first data. For example, the receiver may identify or detect, based on the first ReTX packet, that second data encoded with the second bitrate corresponds to the second data encoded with the first bitrate that is unavailable to be output and expected to be included in a second TX packet. For example, the receiver may detect or identify a value (e.g., sequence number) indicating correspondence between the second data included in the first ReTX packet to second data expected to be included in a second TX packet (e.g., an unreceived or corrupted TX packet). The identified or detected sequence number associated with the second data encoded with the second bitrate may sequentially follow a sequence number associated with the first data encoded with the first bitrate (e.g., as indicated based on the first TX packet). In another aspect, the receiver may detect or identify correspondence based on one or more resources (e.g., subframes or slots) in which the first ReTX packet is received. For example, scheduling of TX packets and ReTX packets may indicate position in time of data (e.g., frames or samples) in a media (e.g., audio/video stream) or in a broadcast. In the context of FIG. 5, the receiver 504 may determine that the second data encoded with the second bitrate is to be output after the first data encoded with the first bitrate based on an indication associated with the first ReTX packet X, X+1, X|2 526 (e.g., an indication associated with frame X 1 508*b* encoded with the second bitrate in the first ReTX packet X, X+1, X+2 526).

At operation 710, the receiver may output the first data encoded with the first bitrate. For example, the receiver may cause a speaker to output the first data according to the first bitrate, or the receiver may cause a display to output the first data according to the first bitrate. In an aspect, the receiver may identify a position of the first data in a media (e.g., audio/video stream) and output the first data based on the identified position of the first data. In the context of FIG. 5, the receiver 504 may output 540 media corresponding to frame X 508*a*, encoded with the first bitrate and included in the TX packet X 520.

At operation 712, the receiver may control gain associated with output of the second data to correspond with the output of the first data. Thus, while output of the second data encoded with the second bitrate may be of a lower quality than output of the first data encoded with the first bitrate (e.g., due to the second bitrate being lower than the first bitrate), the receiver may attempt to perform operations to cause output of data encoded with the second bitrate to be seamless and smooth in the context of outputting data encoded with the first bitrate. In an example, the receiver may identify a volume level associated with output of the first data encoded with the first bitrate, and then the receiver may apply a voltage to output of the second data encoded with the second bitrate based on the identified volume level in order to cause the volume of the output of the second data encoded with the second bitrate to correspond to the identified volume. In the context of FIG. 5, the receiver 504 may control gain associated with output 542 of media of the frame X+1 508b encoded with the second bitrate to correspond with output 540 of media of the frame X 508a encoded with the first bitrate.

At operation 714, the receiver may output the second data encoded with the second bitrate based on the determination that the second data encoded with the first bitrate is unavailable to be output. For example, the receiver may cause a speaker to output the second data according to the second bitrate, or the receiver may cause a display to output the second data according to the second bitrate. In an aspect, the receiver may identify a position of the second data in a media (e.g., audio/video stream) and output the second data based on the identified position of the second data (see, e.g., operation 708). In the context of FIG. 5, the receiver 504 may output 542 data corresponding to frame X+1 508b, encoded with the second bitrate and included in the first ReTX packet X, X+1, X+2 526.

Figure 8:
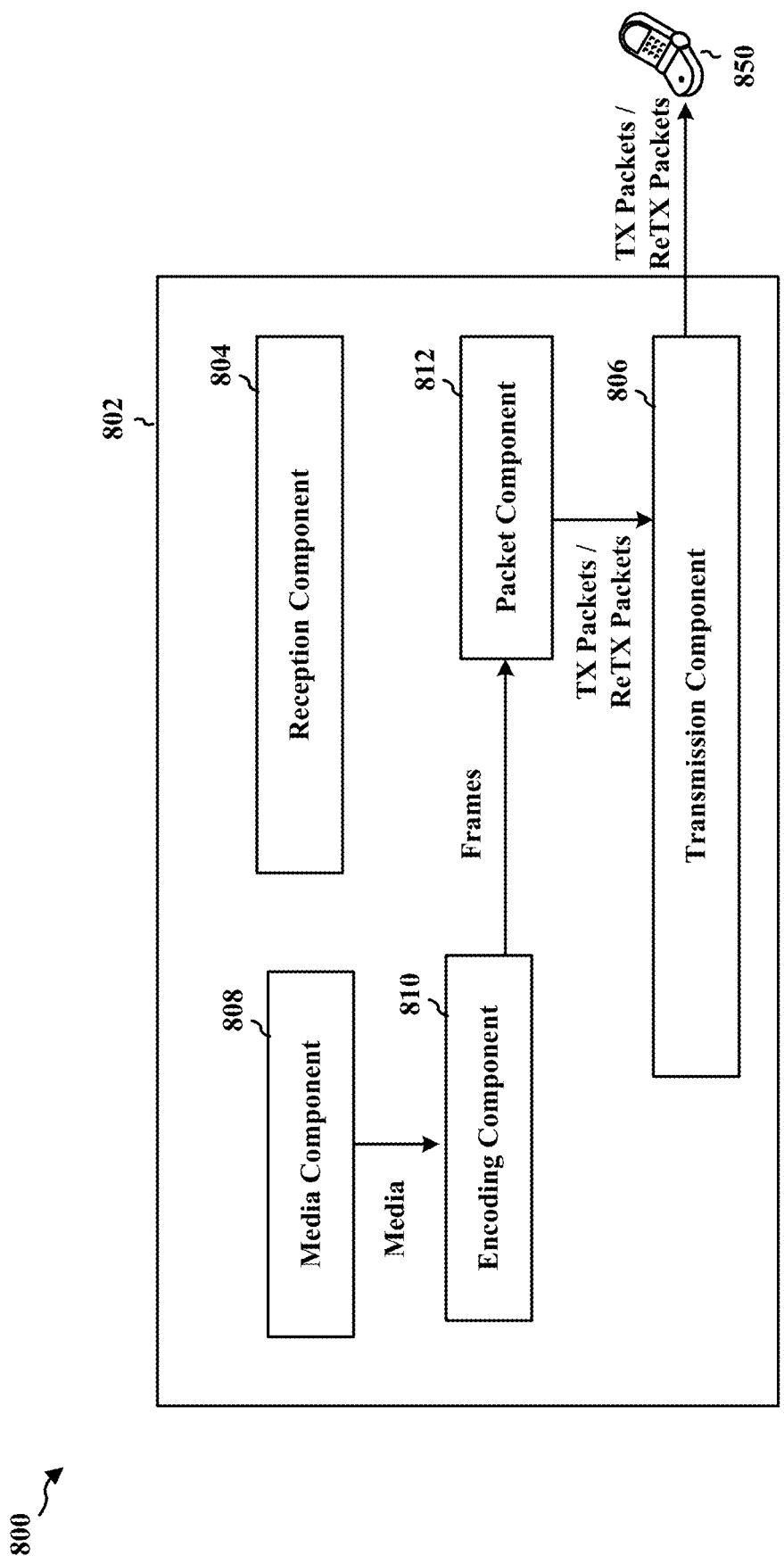
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a transmitter (e.g., the base station 102, the base station 310, the transmitter 502). The apparatus 802 may include additional/other components and/or may include additional and/or other data flow.

The apparatus 802 may include a reception component 804 configured to receive signals, for example, over a wireless network. The apparatus 802 may include a transmission component 806 configured to transmit signals, for example, over a wireless network to a receiver 850.

The apparatus 802 may include a media component 808. The media component 808 may be configured to determine media (e.g., audio/video) that is to be transmitted to a receiver. For example, the media component 808 may generate a media (e.g., digital data stream) representative of audio/video. In an aspect, the media component 808 can include a microphone or camera (e.g., video camera) configured to capture audio or video for transmission. In another aspect, the media component 808 may receive, through the reception component 804, media that is to be transmitted to the receiver 850. The media component 808 may provide the media to an encoding component 810.

The encoding component 810 may be configured to segment the media into a plurality of frames. The encoding component 810 may encode the frames according to a first bitrate. Each frame may be a respective duration (e.g., a first frame may be of a first duration).

The encoding component 810 may further encode the frames according to a second bitrate, and the second bitrate may be lower than the first bitrate. The encoding component 810 may encode frames so that a frame is of a same or substantially similar duration whether encoded according to the first bitrate or the second bitrate (e.g., the first frame may be of the first duration whether encoded with the first bitrate or the second bitrate).

In an aspect, the encoding component 810 may include at least one DSP configured to encode frames according to the first bitrate. The encoding component 810 may further include a second DSP configured to encode frames according to the second bitrate. In another aspect, the at least one DSP may be configured with a second setting so that frames may be encoded with the second bitrate.

The encoding component 810 may further encode frames with a third bitrate that is lower than the second bitrate (and, by extension, the first bitrate).

In an aspect, the encoding component 810 may include an indication associated with a frame, such as a first indication associated with a first frame, a second indication associated with a second frame, and a third indication associated with a third frame. For example, the indication may be included in a header. An example of an indication includes a sequence number or other sequential value. An indication may facilitate in-order delivery of frames so that the media may be sequentially output by the receiver 850.

The encoding component 810 may provide encoded frames to a packet component 812. The packet component 812 may be configured to packetize frames. In various aspects, the packet component 812 may packetize frames encoded with the first bitrate in respective TX packets. For example, a first frame encoded with the first bitrate may be packetized in a first TX packet, a second frame encoded with the first bitrate may be packetized in a second TX packet, a third frame encoded with the first bitrate may be packetized in a third TX packet, and so forth.

The packet component 812 may packetize a plurality of frames encoded with the second bitrate in a single ReTX packet for retransmissions of the frames. For example, the packet component 812 may packetize the first frame encoded with the second bitrate, the second frame encoded with the second bitrate, and the third frame encoded with the second bitrate in a first ReTX frame.

In an aspect, the packet component 812 may packetize a plurality of frames encoded with the third bitrate in a single ReTX packet for retransmissions of the frames. For example, the packet component 812 may packetize the first frame encoded with the third bitrate, the second frame encoded with the third bitrate, and the third frame encoded with the third bitrate in a third ReTX frame.

The packet component 812 may provide the TX packets and the ReTX packets to the transmission component 806. The transmission component 806 may transmit a first plurality of TX packets, such as the first TX packet including the first frame encoded with the first bitrate, the second TX packet including the second frame encoded with the first bitrate, and the third TX packet including the third frame encoded with the first bitrate.

After transmission of the first plurality of TX packets, the transmission component 806 may transmit (e.g., broadcast) one or more ReTX packets corresponding to retransmissions of the frames transmitted in the first plurality of TX packets. For example, the transmission component 806 may transmit (e.g., broadcast) the first ReTX packet after transmission of the first, second, and third TX packets. Similarly, the transmission component 806 may transmit (e.g., broadcast) the second ReTX packet, for example, after transmission of the first ReTX packet.

The apparatus may include additional components that perform each of the blocks of the algorithm in the aforementioned flowcharts of FIG. 6. As such, each block in the aforementioned flowcharts of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
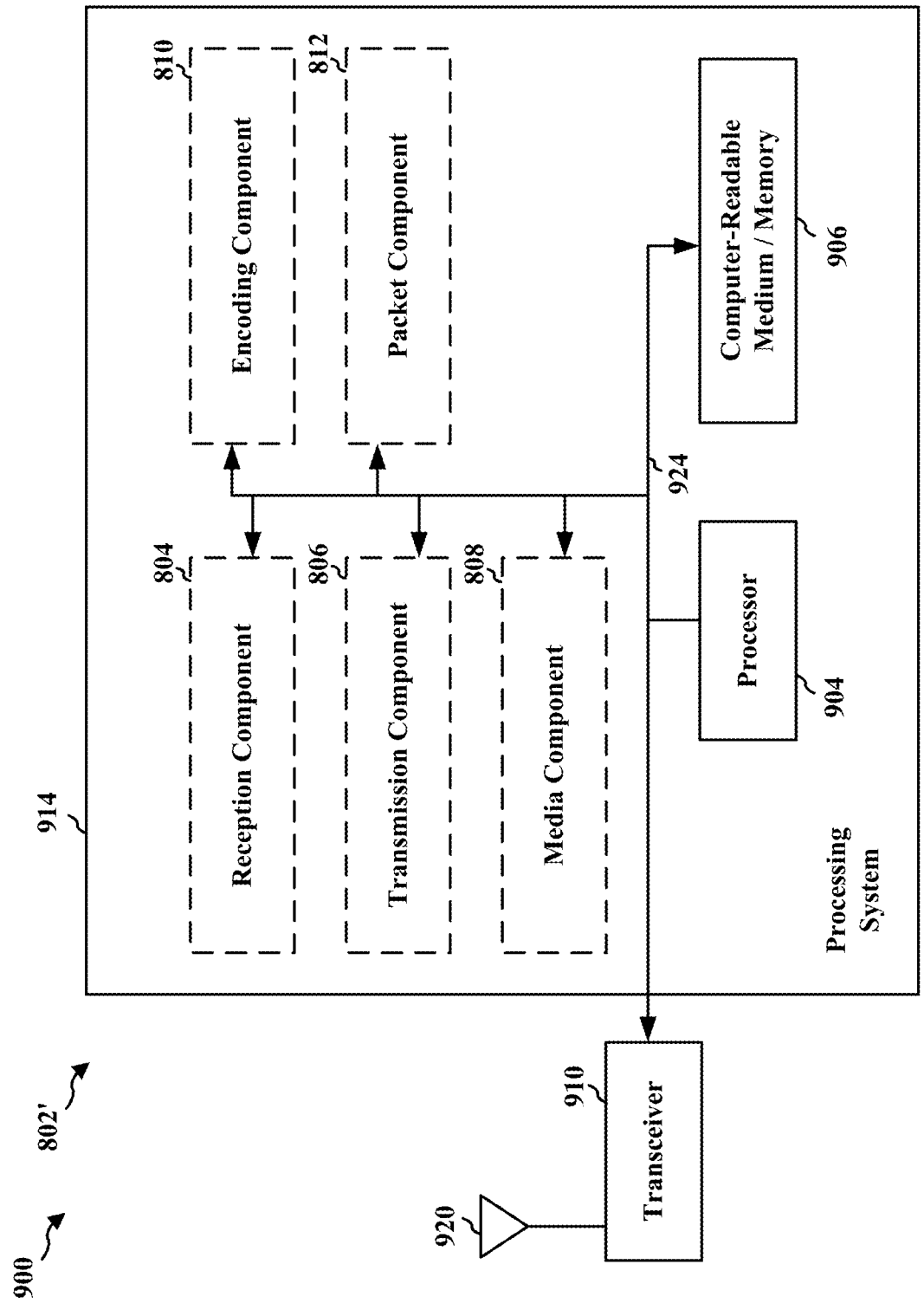
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/ memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof. The processing system 914 may be a component of the base station 310 and may include the memory 376 and/or at least one of the TX processor 316, the RX processor 370, and the controller/processor 375.

In one configuration, the apparatus 802/802' for wireless communication includes means for sending a first transmission packet, the first transmission packet including first data encoded with a first bitrate. The apparatus 802/802' may further include means for sending a second transmission packet, the second transmission packet including second data encoded with the first bitrate. The apparatus 802/802' may further include means for sending a first retransmission packet after sending the first transmission packet and the second transmission packet, the first retransmission packet including the first data encoded with a second bitrate and the second data encoded with the second bitrate. In an aspect, the first bitrate is higher than the second bitrate.

In an aspect, the first data includes at least one of audio data or video data. In an aspect, the first data includes an audio frame associated with a duration, the duration being equal when the first data is encoded with the first bitrate and when the first data is encoded with the second bitrate. In an aspect, the first transmission packet, the second transmission packet, and the first retransmission packet are sent as broadcast. In an aspect, the first retransmission packet indicates that the first data encoded with the second bitrate corresponds to the first data encoded with the first bitrate included in the first transmission packet, and the first retransmission packet further indicates that the second data encoded with the second bitrate corresponds to the second data encoded with the first bitrate included in the second transmission packet.

In an aspect, the apparatus 802/802' further includes means for sending a second retransmission packet after sending the first retransmission packet, the second retransmission packet including the first data encoded with a third bitrate and the second data encoded with the third bitrate. In an aspect, the third bitrate is equal to the second bitrate or the third bitrate is lower than the second bitrate.

In an aspect, the apparatus 802/802' further includes means for encoding, by a first DSP, the first data with the first bitrate for inclusion in the first transmission packet and the second data with the first bitrate for inclusion in the second transmission packet. The apparatus 802/802' may further include means for encoding, by a second DSP, the first data with the second bitrate for inclusion in the first retransmission packet.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
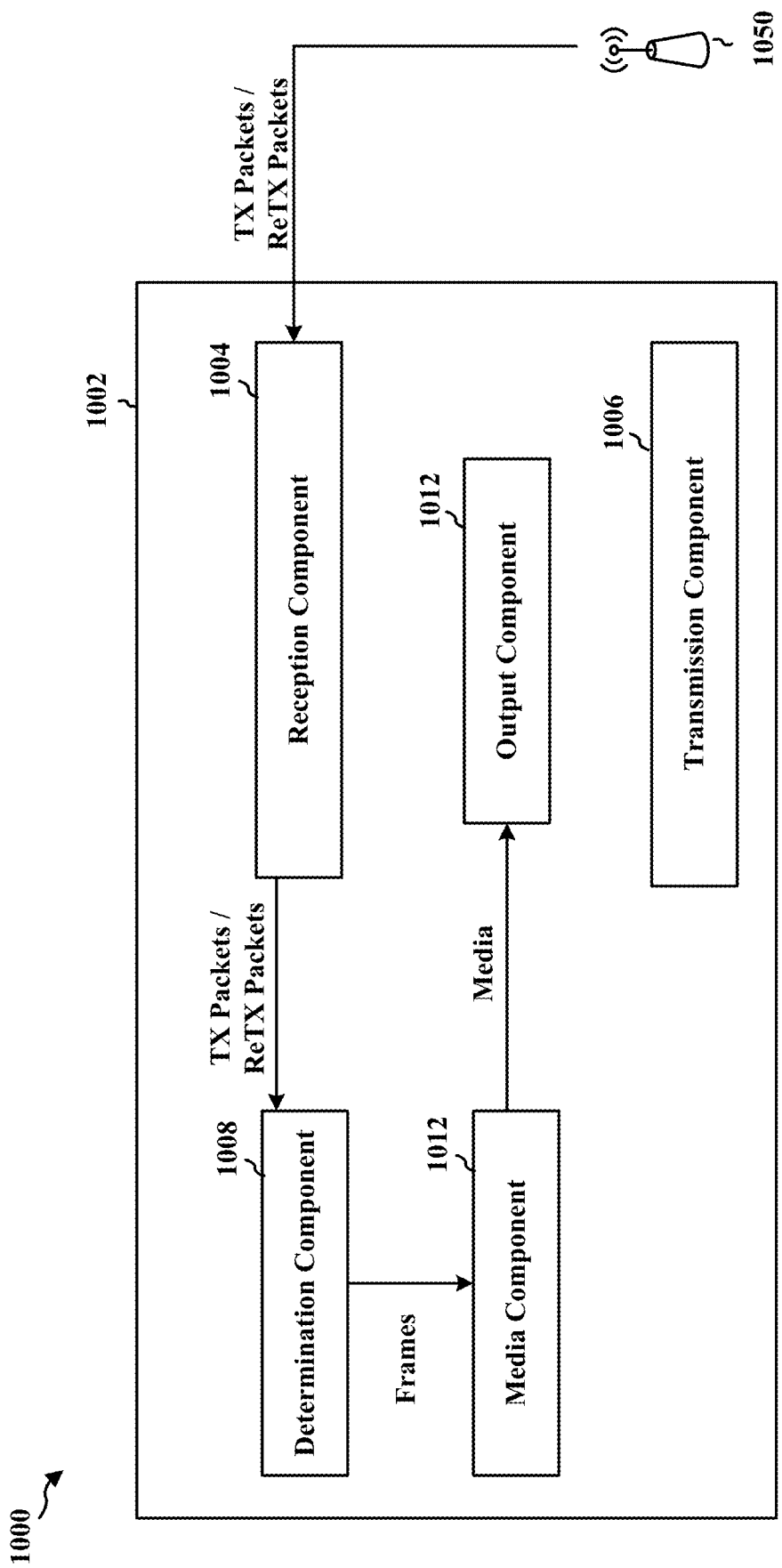
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus 1002 may be a receiver (e.g., the UE 104, the UE 350, the receiver 504). The apparatus 1002 may include additional/other components and/or may include additional and/or other data flow.

The apparatus 1002 may include a transmission component 806 configured to transmit signals, for example, over a wireless network. The apparatus 1002 may include a reception component 804 configured to receive signals, for example, from a transmitter 1050 over a wireless network. For example, the reception component 804 may receive TX packets and ReTX packets as part of a broadcast, and the TX packets and ReTX packets may be unacknowledged.

The apparatus 1002 may include a determination component 1008. The determination component 1008 may receive, through the reception component 1004, a one or more TX packets and one or more ReTX packets. TX packets may include a frame encoded with a first bitrate. ReTX packets may include a plurality of frames, each of which may be encoded with a second bitrate that is lower than the first bitrate.

In an aspect, the determination component 1008 may receive a first TX packet including a first frame encoded with the first bitrate. Similarly, the determination component 1008 may receive a first ReTX packet after receiving the first TX packet, and the first ReTX packet may include a second frame encoded with the second bitrate (as well as the first frame encoded with the second bitrate).

In aspects, the determination component 1008 may determine that the second frame encoded with the first bitrate is unavailable to be output. For example, the determination component 1008 may determine that a second TX packet including the second frame encoded with the first bitrate is unreceived. In another aspects, the determination component 1008 may determine that the second TX packet including the second frame encoded with the first bitrate is corrupted, or that the second frame encoded with the first bitrate is corrupted, and therefore unavailable to be output according to the first bitrate.

The determination component 1008 may provide the first frame encoded with the first bitrate to a media component 1010. The determination component 1008 may also provide the second frame encoded with the second bitrate to the media component 1010.

The media component 1010 may arrange frames in sequential order to be output as a media (e.g., audio/video or other media). For example, the media component 1010 may determine that the second frame encoded with the second bitrate is to be output after the first frame encoded with the first frame, e.g., based on a first indication (e.g., first sequence number) associated with the first frame and a second indication (e.g., second sequence number) associated with the second frame.

In an aspect, the media component 1010 may decode the frames. For example, the media component 1010 may include at least a first DSP that may decode the first frame according to the first bitrate. In one aspect, the media component 1010 may include a second DSP or may configure the first DSP with a second setting in order to decode the second frame according to the second bitrate.

The media component 1010 may provide the media (including the first frame and the second frame) to an output component 1012. The output component 1012 may include one or more components configured to output a media, such as a display and/or speaker. The output component 1012 may output the first frame. After outputting the first frame, the output component 1012 may output the second frame. Because the first bitrate is higher than the second bitrate, the output of the first frame may be of a higher quality than the output of the second frame.

In one aspect, the output component 1012 may control gain associated with output of the second frame to correspond to output of the first frame. Thus, the output component 1012 may attempt to provide a smooth and seamless output of frames, regardless of the bitrate with which those frames are encoded.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
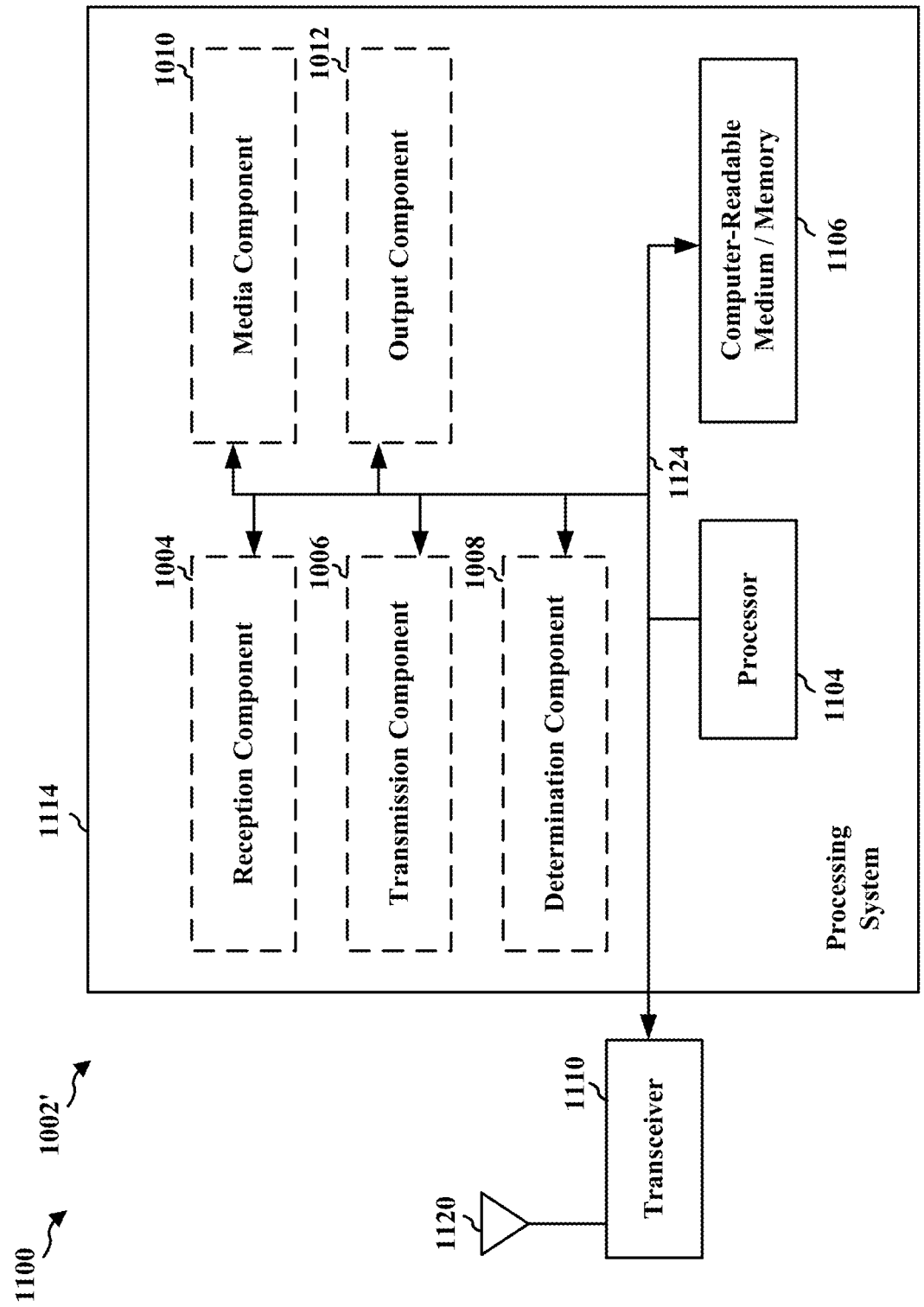
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for receiving a first transmission packet, the first transmission packet including first data encoded with a first bitrate. The apparatus 1002/1002' may further include means receiving a first retransmission packet after receiving the first transmission packet, the first retransmission packet including second data encoded with a second bitrate, and the first bitrate is higher than the second bitrate. The apparatus 1002/1002' may further include means for determining that the second data encoded with the first bitrate is unavailable to be output. The apparatus 1002/1002' may further include means for outputting the second data encoded with the second bitrate based on the determination that the second data encoded with the first bitrate is unavailable to be output. In an aspect, the first data and the second data include at least one of audio data or video data.

In an aspect, the apparatus 1002/1002' may further include means for outputting the first data encoded with the first bitrate, and the output of the first data is higher quality than the output of the second data based on the first bitrate being higher than the second bitrate.

In an aspect, the apparatus 1002/1002' may further include means for controlling gain associated with the output of the second data to correspond with the output of the first data. In an aspect, the apparatus 1002/1002' may further include means for determining that the second data encoded with the second bitrate is to be output after the output of the first data based on an indication associated with the first retransmission packet indicating that the second data sequentially follows the first data. In an aspect, the first retransmission packet further includes the first data encoded with the second bitrate. In an aspect, the first transmission packet and the first retransmission packet are received as broadcast, and the reception of the first transmission packet and the reception of the first retransmission packet are unacknowledged by the receiver.

In an aspect, the means for determining that the second data encoded with the first bitrate is unavailable to be output is configured to determine that a second transmission packet is unreceived, the second transmission packet being expected to include the second data encoded with the first bitrate.

In an aspect, the means for determining that the second data encoded with the first bitrate is unavailable to be output is configured to determine that a second transmission packet including the second data encoded with the first bitrate is corrupted or the second data encoded with the first bitrate is corrupted.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a transmitter, the method comprising:
   sending a first transmission packet, the first transmission packet including first data encoded with a first bitrate;
   sending a second transmission packet, the second transmission packet including second data encoded with the first bitrate; and
   sending a first retransmission packet after sending the first transmission packet and the second transmission packet, the first retransmission packet including the first data encoded with a second bitrate and the second data encoded with the second bitrate, wherein the first bitrate is higher than the second bitrate, wherein the first retransmission packet includes a first indication indicating the first data encoded with the second bitrate corresponds to the first data encoded with the first bitrate included in the first transmission packet, and wherein the first retransmission packet further include a second indication indicating that the second data encoded with the second bitrate corresponds to the second data encoded with the first bitrate included in the second transmission packet.

2. The method of claim 1, wherein the first data includes at least one of audio data or video data.

3. The method of claim 2, wherein the first data comprises an audio frame associated with a duration, the duration being equal when the first data is encoded with the first bitrate and when the first data is encoded with the second bitrate.

4. The method of claim 1, wherein the first transmission packet, the second transmission packet, and the first retransmission packet are sent as broadcast.

5. The method of claim 1, further comprising:
   sending a second retransmission packet after sending the first retransmission packet, the second retransmission packet including the first data encoded with a third bitrate and the second data encoded with the third bitrate.

6. The method of claim 5, wherein the third bitrate is equal to the second bitrate or the third bitrate is lower than the second bitrate.

7. The method of claim 1, further comprising:
   encoding, by a first digital signal processor (DSP), the first data with the first bitrate for inclusion in the first transmission packet and the second data with the first bitrate for inclusion in the second transmission packet; and
   encoding, by a second DSP, the first data with the second bitrate for inclusion in the first retransmission packet.

8. A method of wireless communication by a receiver, the method comprising:
   receiving a first transmission packet, the first transmission packet including first data encoded with a first bitrate;
   receiving a first retransmission packet after receiving the first transmission packet, the first retransmission packet including second data encoded with a second bitrate, wherein the first bitrate is higher than the second bitrate, wherein the first retransmission packet includes a first indication indicating the first data encoded with the second bitrate corresponds to the first data encoded with the first bitrate included in the first transmission packet, and wherein the first retransmission packet further include a second indication indicating that the second data encoded with the second bitrate corresponds to the second data encoded with the first bitrate included in the second transmission packet;

determining that the second data encoded with the first bitrate is unavailable to be output; and outputting the second data encoded with the second bitrate based on the determination that the second data encoded with the first bitrate is unavailable to be output.

9. The method of claim 8, wherein the first data and the second data include at least one of audio data or video data.

10. The method of claim 8, further comprising:
outputting the first data encoded with the first bitrate,
wherein the output of the first data is higher quality than the output of the second data based on the first bitrate being higher than the second bitrate.

11. The method of claim 10, further comprising:
controlling gain associated with the output of the second data to correspond with the output of the first data.

12. The method of claim 10, further comprising:
determining that the second data encoded with the second bitrate is to be output after the output of the first data based on an indication associated with the first retransmission packet indicating that the second data sequentially follows the first data.

13. The method of claim 10, wherein the first retransmission packet further includes the first data encoded with the second bitrate.

14. The method of claim 8, wherein the first transmission packet and the first retransmission packet are received as broadcast, and wherein the reception of the first transmission packet and the reception of the first retransmission packet are unacknowledged by the receiver.

15. The method of claim 8, wherein the determining that the second data encoded with the first bitrate is unavailable to be output comprises:
determining that a second transmission packet is unreceived, the second transmission packet being expected to include the second data encoded with the first bitrate.

16. The method of claim 8, wherein the determining that the second data encoded with the first bitrate is unavailable to be output comprises:
determining that a second transmission packet including the second data encoded with the first bitrate is corrupted or the second data encoded with the first bitrate is corrupted.

17. A transmitter comprising:
means for sending a first transmission packet, the first transmission packet including first data encoded with a first bitrate;
means for sending a second transmission packet, the second transmission packet including second data encoded with the first bitrate; and
means for sending a first retransmission packet after sending the first transmission packet and the second transmission packet, the first retransmission packet including the first data encoded with a second bitrate and the second data encoded with the second bitrate, wherein the first bitrate is higher than the second bitrate, wherein the first retransmission packet includes a first indication indicating the first data encoded with the second bitrate corresponds to the first data encoded with the first bitrate included in the first transmission packet, and wherein the first retransmission packet further include a second indication indicating that the second data encoded with the second bitrate corresponds to the second data encoded with the first bitrate included in the second transmission packet.

18. The transmitter of claim 17, wherein the first data includes at least one of audio data or video data.

19. The transmitter of claim 18, wherein the first data comprises an audio frame associated with a duration, the duration being equal when the first data is encoded with the first bitrate and when the first data is encoded with the second bitrate.

20. The transmitter of claim 17, wherein the first transmission packet, the second transmission packet, and the first retransmission packet are sent as broadcast.

21. The transmitter of claim 17, further comprising:
means for sending a second retransmission packet after sending the first retransmission packet, the second retransmission packet including the first data encoded with a third bitrate and the second data encoded with the third bitrate.

22. The transmitter of claim 21, wherein the third bitrate is equal to the second bitrate or the third bitrate is lower than the second bitrate.

23. The transmitter of claim 17, further comprising:
means for encoding, by a first digital signal processor (DSP), the first data with the first bitrate for inclusion in the first transmission packet and the second data with the first bitrate for inclusion in the second transmission packet; and
means for encoding, by a second DSP, the first data with the second bitrate for inclusion in the first retransmission packet.

24. A receiver comprising:
means for receiving a first transmission packet, the first transmission packet including first data encoded with a first bitrate;
means receiving a first retransmission packet after receiving the first transmission packet, the first retransmission packet including second data encoded with a second bitrate, wherein the first bitrate is higher than the second bitrate, wherein the first retransmission packet includes a first indication indicating the first data encoded with the second bitrate corresponds to the first data encoded with the first bitrate included in the first transmission packet, and wherein the first retransmission packet further include a second indication indicating that the second data encoded with the second bitrate corresponds to the second data encoded with the first bitrate included in the second transmission packet;
means for determining that the second data encoded with the first bitrate is unavailable to be output; and
means for outputting the second data encoded with the second bitrate based on the determination that the second data encoded with the first bitrate is unavailable to be output.

25. The receiver of claim 24, wherein the first data and the second data include at least one of audio data or video data.

26. The receiver of claim 24, further comprising:
means for outputting the first data encoded with the first bitrate,
wherein the output of the first data is higher quality than the output of the second data based on the first bitrate being higher than the second bitrate.

27. The receiver of claim 26, further comprising:
means for controlling gain associated with the output of the second data to correspond with the output of the first data.

28. The receiver of claim 26, further comprising:
   means for determining that the second data encoded with the second bitrate is to be output after the output of the first data based on an indication associated with the first retransmission packet indicating that the second data sequentially follows the first data.

\* \* \* \* \*